(12) United States Patent
Kato et al.

(10) Patent No.: US 7,272,317 B2
(45) Date of Patent: Sep. 18, 2007

(54) OPTICAL MULTIPLEXING COMMUNICATION SYSTEM USING ULTRA HIGH SPEED SIGNAL TRANSMISSION

(75) Inventors: Masao Kato, Atsugi (JP); Kazuo Fujiura, Atsugi (JP); Takashi Kurihara, Atsugi (JP); Shunichi Souma, Yamato (JP)

(73) Assignee: Nippon Telegraph and Telephone Corporation (JP)

( * ) Notice: Subject to any disclaimer, the term of this patent is extended or adjusted under 35 U.S.C. 154(b) by 702 days.

(21) Appl. No.: 10/436,543

(22) Filed: May 12, 2003

(65) Prior Publication Data

US 2003/0231885 A1 Dec. 18, 2003

(30) Foreign Application Priority Data

May 13, 2002 (JP) .......................... P2002-137699

(51) Int. Cl.
*H04J 4/00* (2006.01)
*H04J 14/00* (2006.01)

(52) U.S. Cl. .......................................... 398/75; 398/47
(58) Field of Classification Search .................. 398/98, 398/85, 84, 79, 75, 74, 43, 42, 69, 80, 47; 359/326
See application file for complete search history.

(56) References Cited

U.S. PATENT DOCUMENTS

| | | | | |
|---|---|---|---|---|
| 3,584,221 A | * | 6/1971 | Furukawa | 398/65 |
| 5,903,368 A | * | 5/1999 | Desurvire et al. | 398/54 |
| 6,023,360 A | * | 2/2000 | Morioka et al. | 398/1 |
| 6,236,498 B1 | * | 5/2001 | Freeman et al. | 359/337.1 |
| 6,249,630 B1 | * | 6/2001 | Stock et al. | 385/123 |
| 6,832,047 B1 | * | 12/2004 | Fuse | 398/79 |
| 2002/0018631 A1 | * | 2/2002 | Arai et al. | 385/127 |
| 2002/0181073 A1 | * | 12/2002 | Kawanishi | 359/326 |

FOREIGN PATENT DOCUMENTS

| JP | 09-205397 | 8/1997 |
|---|---|---|
| JP | 2001-109024 | 4/2001 |

OTHER PUBLICATIONS

Hatami-Hanza H et al: "Demonstration of All-Optical Demultiplexing of a Multilevel Soliton Signal Employing Soliton Decomposition and Self-Frequency Shift" IEEE Photonics Technology Letters, IEEE Inc. New York, US, vol 9, No. 6; Jun. 1, 1997, pp. 833-835, ISSN: 1041-1135.*

Hatami-Hanza H et al:"Demonstration of All-Optical Demultiplexing of a Multilevel Soliton Signal Employing Soliton Decomposition and Self-Frequency Shift" IEEE Photonics Technology Letters, IEEE Inc. New York, US, vol. 9, No. 6; Jun. 1, 1997, pp. 833-835, issn: 1041-1135.*

U.S. Appl. No. 10/288,357, filed Aug. 27, 2002, Kato et al.

(Continued)

*Primary Examiner*—Shi K Li
(74) *Attorney, Agent, or Firm*—Kilpatrick Stockton LLP

(57) ABSTRACT

In an optical multiplexing communication system, a frequency conversion of the optical multiplexed signals having different amplitudes for different communication channels into a plurality of optical pulse sequences having different carrier frequencies for different communication channels is carried out, and the plurality of optical pulse sequences obtained by the frequency conversion are demultiplexed into optical pulse sequences for different communication channels.

15 Claims, 28 Drawing Sheets

OTHER PUBLICATIONS

Gordon, J.P., "Theory of the Soliton Self-Frequency Shift", *Optic Letters*, vol. 11, No. 10, pp. 662-664 (1986).

Mitschke, F.M., et al., "Discovery of the Soliton Self-Frequency Shift", Optics Letters, vol. 11, No. 10, pp. 659-661 (1986).

Nishizawa, N., et al., "Compact System of Wavelength-Tunable Femtosecond Soliton Pulse Generation Using Optical Fibers", *IEEE Photonics Technology Letters*, vol. 11, No. 3, pp. 325-327 (1999).

* cited by examiner

INPUT SIGNAL

OUTPUT SIGNAL

OUTPUT SIGNAL

WAVELENGTH SHIFT ACCORDING TO
INPUT PULSE INTENSITY

BEFORE SIGNAL DEMULTIPLEXING

AFTER SIGNAL DEMULTIPLEXING

OPTICAL INTENSITY MODULATOR
DRIVING VOLTAGE WAVEFORM

OPTICAL SIGNALS AFTER PASSING
OPTICAL INTENSITY MODULATOR

INPUT SIGNAL

OPTICAL INTENSITY MODULATOR DRIVING VOLTAGE WAVEFORM

OPTICAL SIGNALS AFTER PASSING OPTICAL INTENSITY MODULATOR

OPTICAL SIGNALS AFTER PASSING
OPTICAL INTENSITY MODULATOR

OPTICAL SIGNALS AFTER PASSING
OPTICAL INTENSITY MODULATOR

OPTICAL SIGNALS AFTER PASSING OPTICAL SWITCH

OPTICAL SIGNALS AFTER PASSING OPTICAL SWITCH

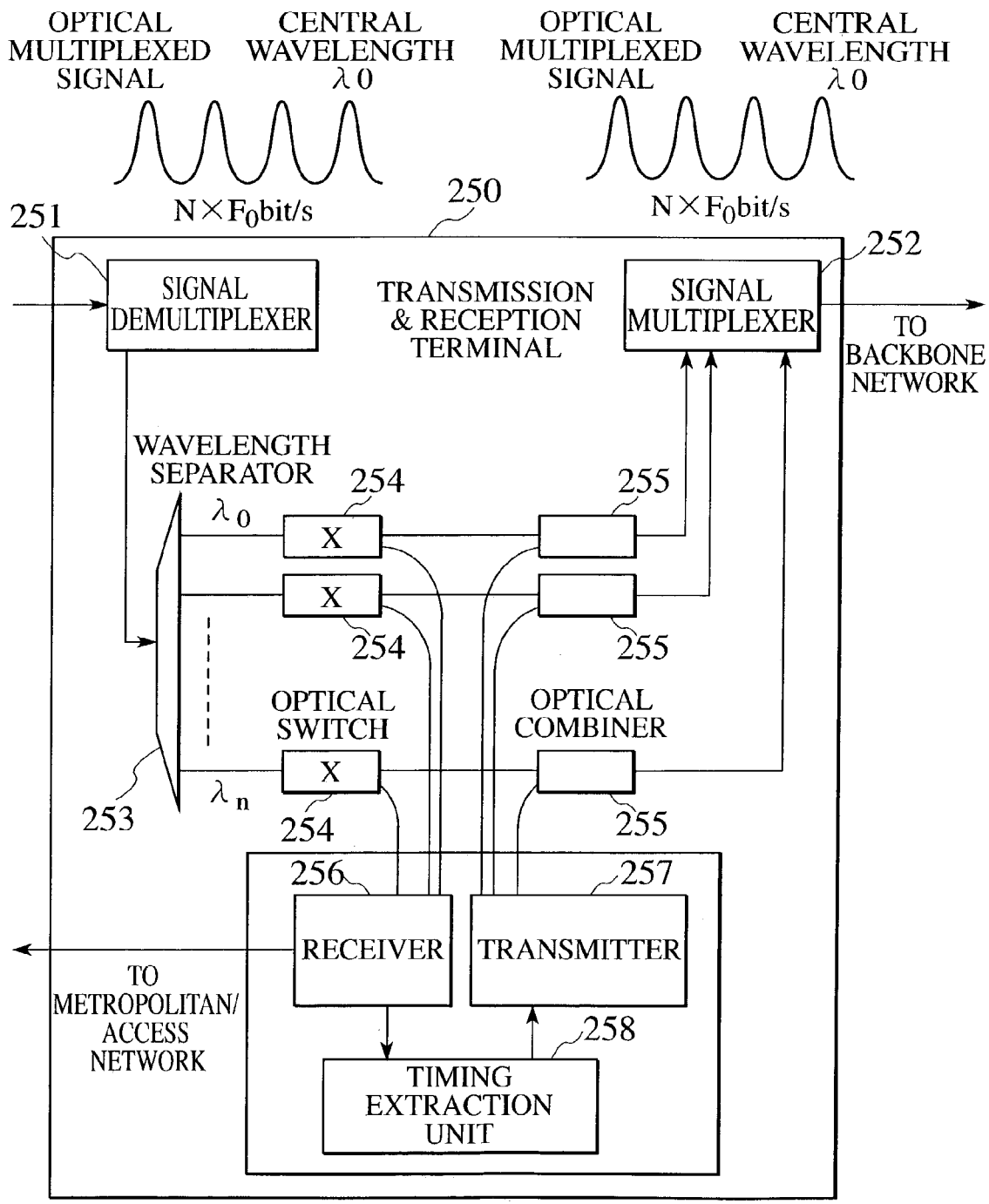

OPTICAL MULTIPLEXING COMMUNICATION SYSTEM USING ULTRA HIGH SPEED SIGNAL TRANSMISSION

BACKGROUND OF THE INVENTION

1. Field of the Invention

The present invention relates to an optical multiplexing communication method, an optical multiplexing communication system, an optical signal multiplexing device, and an optical multiplexed signal demultiplexing device for optical signals used in a high speed optical transmission system, a wavelength division multiplexing transmission system, an optical signal processing system, etc.

2. Description of the Related Art

A ultra high speed optical transmission system aiming at the realization of an optical communication system with a larger capacity has been under the development in view of the rapid increase of traffics in the data communications. More specifically, the attempt has been made to replace the multiplexing/demultiplexing circuits that have been formed by electronic circuits with all-optical type optical signal processing circuits, so as to eliminate the limitation due to the electronic circuits on the transmission speed.

The basic concept behind such a prior art is that portions such as the optical modulation unit and the photo-detection unit that can be processed by the electronic circuits will be electrically processed at a low speed, while portions that can be processed all-optically will be processed as ultra high speed signals with the operation speed faster than that of the electronic circuit which are realized by the optical time division multiplexing. Based on this concept, the ultra high speed transmission experiments of 400 Gbit/s, 640 Gbit/s, and 1.28 Tbit/s have been reported so far.

FIG. 10 schematically shows a conventional ultra high speed optical communication system using the optical time division multiplexing. As shown in FIG. 10, the optical signals of $F_\sigma$ Hz before the multiplexing that are generated from a light source 51 are all optically time division N demultiplexed at the optical signal multiplexing device (optical multiplexer) 53, electrically modulated by an optical modulator 52, and then N multiplexed again by the optical signal multiplexing device 53, and transmitted through an optical transmission line as the optical multiplexed signals of $N \times F_\sigma$ bit/s. The optical multiplexed signals received by an optical multiplexed signal demultiplexing device (optical demultiplexer) 54 are demultiplexed into the optical signals of $F_\sigma$ bit/s in N communication channels, and the demultiplexed optical signals of $F_\sigma$ bit/s are converted into electric signals by photo-detectors 55 provided in correspondence to the respective communication channels and processed electrically.

FIG. 11 shows an exemplary configuration of the conventional optical signal multiplexing device 53. The optical signal multiplexing device 53 of FIG. 11 comprises delay lines 56 capable of realizing the ultra high speed signal pulse sequences of $N \times F_\sigma$ bit/s by the N-fold time division multiplexing, and N sets of optical branching couplers 57. Here, the branching ratio of the optical branching coupler 57 is fixed such that the optical signal pulse sequences after the multiplexing have equal amplitudes. FIG. 12 schematically shows a concept of the conventional optical signal multiplexing described above.

The representative optical signal multiplexing device proposed so far is one in which delay lines with delay time differences which are multiples of a prescribed delay time are combined in multiple stages, and the representative optical multiplexed signal demultiplexing device is one in which a nonlinear optical loop mirror (NOLM) of the Sagnac interferometer is combined with the optical Kerr effect.

FIG. 13 schematically shows an exemplary configuration of the conventional optical multiplexed signal demultiplexing device 54. As shown in FIG. 13, the control pulses of $F_\sigma$ bit/s are indispensable in order to demultiplex the ultra high speed signal pulses of $N \times F_\sigma$ bit/s into signal components of $F_\sigma$ bit/s. Here, in order to utilize the interference effect that occurs between the optical signals and the control pulse sequences, the control pulse sequences are required to be capable of being synchronized timewise with and having the polarization direction identical to the time division multiplexed input light signals, and to be having the optical intensity sufficiently larger than the optical signals.

Among the prior arts described above, the optical signal multiplexing device has a problem that, when the number of multiplexing N is increased to realize a large capacity, the time interval $T_\sigma$ between the optical signals becomes shorter so that there is a need to narrow down the pulse width T of the optical signals to be multiplexed and use the ultra short optical pulses that are difficult to transmit as the signal lights, and consequently the adaptation to the system is difficult.

On the other hand, the optical multiplexed signal demultiplexing device has a problem that there is a need to provide the high output short pulse light source for the control pulses, and a problem that the synchronization of timings of the optical signals and the control pulses is very difficult so that there is a need for the optical phase lock using an optical phase lock loop 58. In addition, it is often difficult to make the polarization directions identical and there is a need to form the entire system by using medium that can maintain the polarization direction for this reason, but there has been a problem that the system having such a configuration is very expensive.

FIG. 14 shows an exemplary configuration of the conventional optical multiplexer 102. The input optical pulse sequences having the clock frequency of $F_\sigma$ Hz are split into N by an optical intensity splitter 106, and the split optical pulse sequences are encoded by optical intensity modulators 107 having delay lines with delay time differences which are multiples of a prescribed delay time, and multiplexed again by an optical multiplexer 108, and then optical TDM signals of $N \times F_\sigma$ bit/s are transmitted. At the optical demultiplexer 103, as shown in FIG. 15, the control pulse sequences having a repetition frequency of $F_\sigma$ Hz are synchronized with the signal lights of $N \times F_\sigma$ bit/s by using an optical phase lock loop circuit 109, and the optical TDM signals are demultiplexed into optical signals of $F_\sigma$ bit/s by the nonlinear interaction (optical Kerr effect).

As shown in FIG. 16, the N-fold time division multiplexed ultra high speed signals of $N \times F_\sigma$ bit/s are produced. The signal (pulse) interval that was $1/F_\sigma$ sec. before the multiplexing is multiplied by $1/N$ by the multiplexing and becomes as short as $(1/N) \times (1/F_\sigma)$ sec. Consequently, the synchronization with the control pulses (of the repetition frequency $F_\sigma$ Hz) at the optical demultiplexer 103 becomes increasingly difficult in counter proportion to the level of multiplexing. Also, the signals propagated through the conventional transmission line have the timing displacements due to the environmental change such as that of the temperature so that the synchronization with the control pulses has been even more difficult. In addition, in order for the signal lights and the control lights to interact at high efficiency, it is necessary to make the polarization directions coincide so that there is a need to construct the entire transmission system by a medium that can maintain the polarization direction, but its realization has a problem in terms of the cost.

BRIEF SUMMARY OF THE INVENTION

It is therefore an object of the present invention to provide an optical multiplexing communication method, an optical multiplexing communication system, an optical signal multiplexing device and an optical multiplexed signal demultiplexing device capable of realizing the ultra high speed transmission using optical multiplexed signals with pulse widths that can be transmitted easily, at low cost.

It is another object of the present invention to provide an ultra high speed optical multiplexed signal demultiplexing device that operates asynchronously and does not require the control pulses.

According to one aspect of the present invention there is provided an optical multiplexing communication method for carrying out communications of optical multiplexed signals in which a plurality of optical signals having an identical carrier frequency are multiplexed, through an optical transmission line, comprising the steps of: (a) carrying out a frequency conversion of the optical multiplexed signals having different amplitudes for different communication channels into a plurality of optical pulse sequences having different carrier frequencies for different communication channels, by using an optical frequency conversion unit having an optical nonlinear medium that changes a refractive index according to light intensities of input lights; and (b) demultiplexing the plurality of optical pulse sequences obtained by the frequency conversion into optical pulse sequences for different communication channels, by using an optical frequency selection unit for selectively separating optical signals according to frequencies.

According to another aspect of the present invention there is provided an optical multiplexing communication system for carrying out communications of optical multiplexed signals in which a plurality of optical signals having an identical carrier frequency are multiplexed, comprising: an optical signal multiplexing device configured to generate a plurality of optical pulse sequences, generate the optical multiplexed signals by multiplexing the plurality of optical pulse sequences on a time axis, and transmit the optical multiplexed signals; an optical transmission line for transmitting the optical multiplexed signals; and an optical multiplexed signal demultiplexing device or a terminal device provided on the optical transmission line between the optical signal multiplexing device and the optical multiplexed signal demultiplexing device, configured to receive the optical multiplexed signals transmitted through the optical transmission line, carry out a frequency conversion of the optical multiplexed signals having different amplitudes for different communication channels into a plurality of optical pulse sequences having different carrier frequencies for different communication channels, by using an optical frequency conversion unit having an optical nonlinear medium that changes a refractive index according to light intensities of input pulses, and demultiplex the plurality of optical pulse sequences obtained by the frequency conversion into optical pulse sequences for different communication channels, by using an optical frequency selection unit for selectively separating optical signals according to frequencies.

According to another aspect of the present invention there is provided an optical signal multiplexing device for generating optical multiplexed signals by multiplexing a plurality of optical signals having an identical carrier frequency, comprising: a pulse sequence generation unit configured to generate a plurality of optical pulse sequences having different amplitudes for different communication channels; and a multiplexing unit configured to generate the optical multiplexed signals by multiplexing the plurality of optical pulse sequences on a time axis.

According to another aspect of the present invention there is provided an optical multiplexed signal demultiplexing device for demultiplexing optical multiplexed signals in which a plurality of optical signals having an identical carrier frequency are multiplexed, into the plurality of optical signals, comprising: an optical frequency conversion unit having an optical nonlinear medium that changes a refractive index according to light intensities of input lights, and configured to carry out a frequency conversion of the optical multiplexed signals having different amplitudes for different communication channels into a plurality of optical pulse sequences having different carrier frequencies for different communication channels; and an optical frequency selection unit configured to demultiplex the plurality of optical pulse sequences obtained by the frequency conversion into optical pulse sequences for different communication channels, by for selectively separating optical signals according to frequencies.

Other features and advantages of the present invention will become apparent from the following description taken in conjunction with the accompanying drawings.

BRIEF DESCRIPTION OF THE DRAWINGS

FIG. 29 is a block diagram showing an exemplary configuration of a transmission and reception terminal used in an optical multiplexing communication system according to the third embodiment of the present invention.

DETAILED DESCRIPTION OF THE INVENTION

Referring now to FIG. 1 to FIG. 9, the first embodiment of the present invention will be described in detail.

Figure 1:
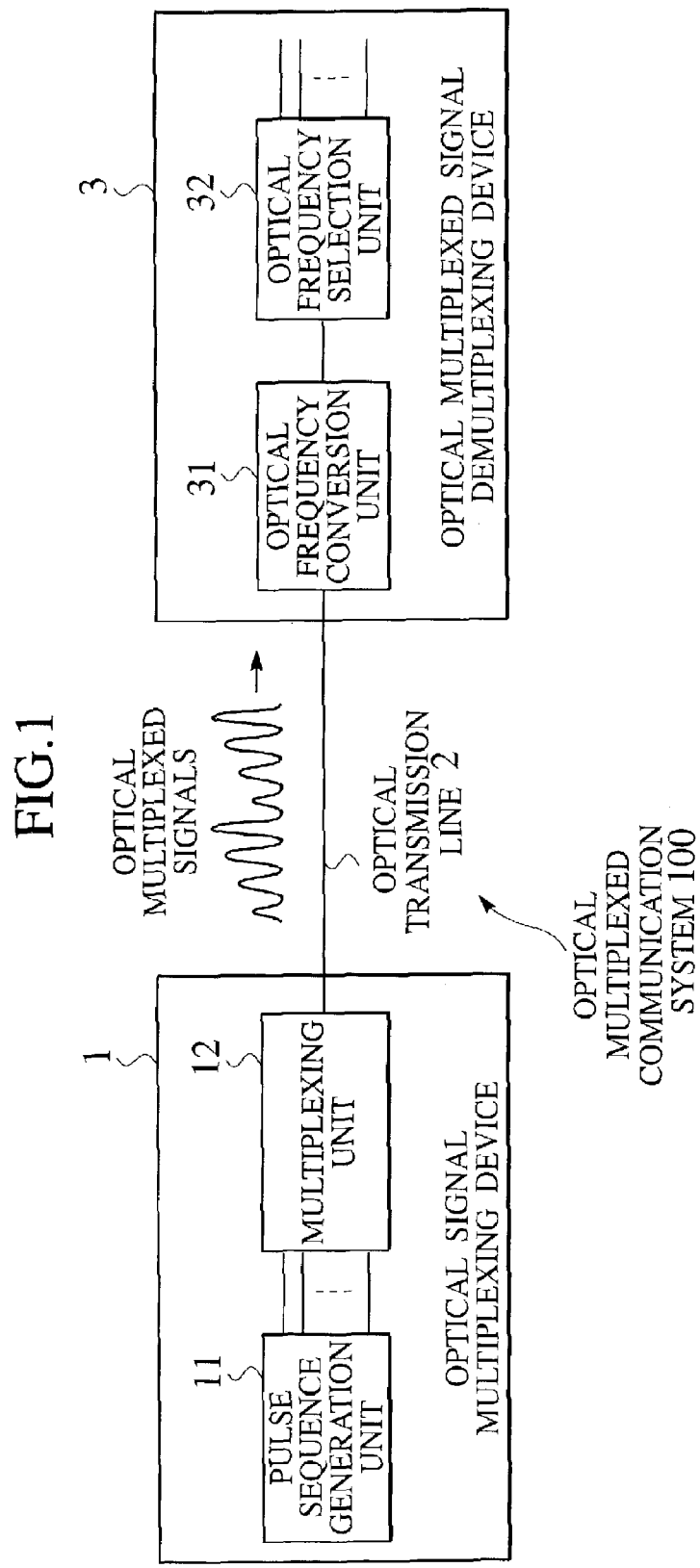
FIG. 1 is a block diagram showing an exemplary configuration of an optical multiplexing communication system using an optical time division multiplexing according to the first embodiment of the present invention.

FIG. 1 shows a configuration of an optical multiplexing communication system according to the first embodiment of the present invention. The optical multiplexing communication system 100 of FIG. 1 comprises an optical signal multiplexing device 1 that functions as a transmitting side device, an optical transmission line 2 such as an optical fiber, and an optical multiplexed signal demultiplexing device 3.

The optical signal multiplexing device 1 has at least a pulse sequence generation unit 11 and a multiplexing unit 12 for generating optical pulse sequences having a unique amplitude for each channel and time division multiplexing the generated optical pulse sequences on time axis and transmitting them.

The optical multiplexed signal demultiplexing device 3 has at least an optical frequency conversion unit 31 with a part formed by an optical nonlinear medium such as an optical fiber, and an optical frequency selection unit 32 formed by an optical filter.

In the following the detailed configuration and operation of each device will be described.

<Optical Signal Multiplexing Device 1>

Figure 2:
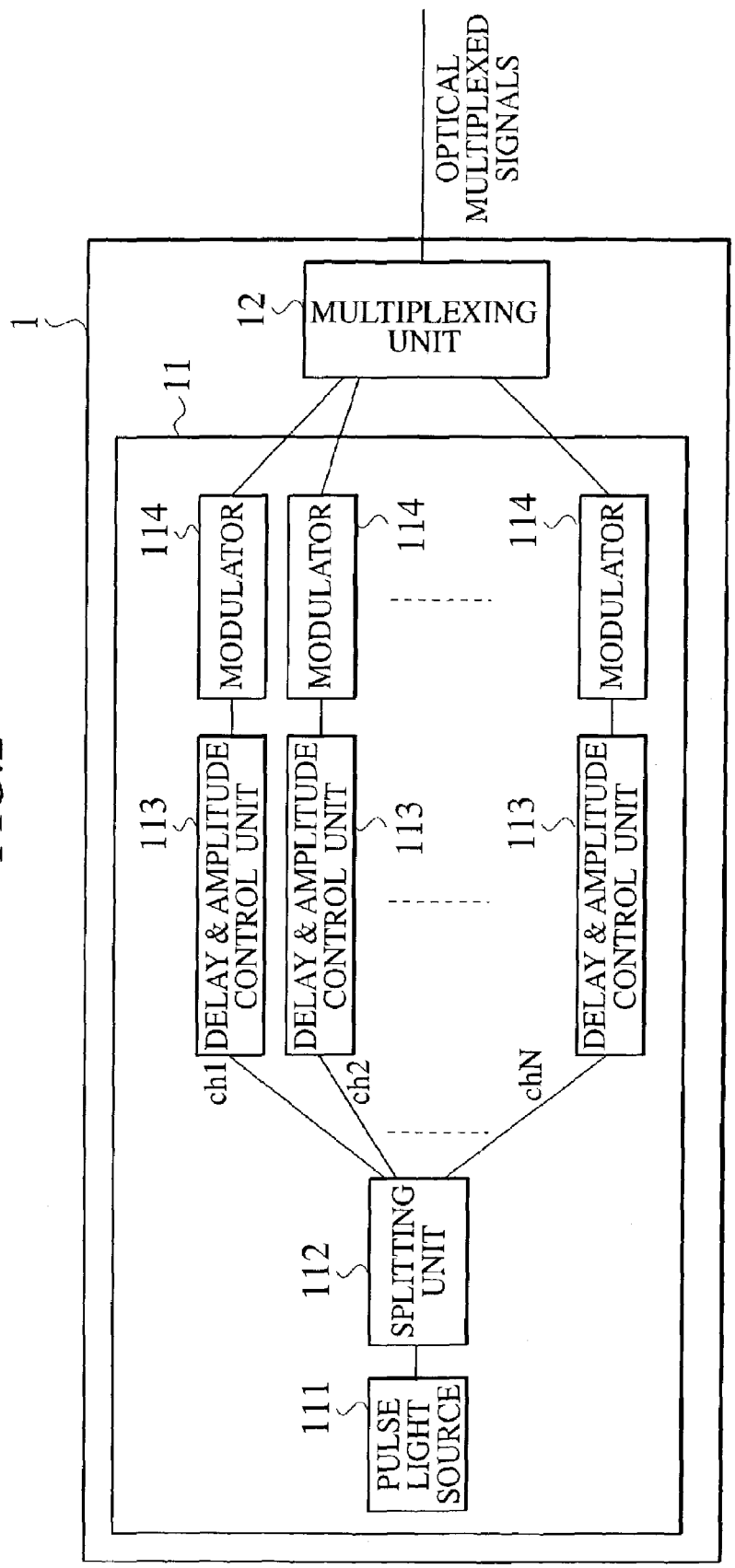
FIG. 2 is a block diagram showing a first exemplary configuration of an optical signal multiplexing device according to the first embodiment of the present invention.

FIG. 2 shows an exemplary configuration of the optical signal multiplexing device 1. In the pulse sequence generation unit 11 of the optical signal multiplexing device 1 shown in FIG. 2, optical signals are outputted from a single pulse light source 111, and these optical signals are split into N (where N is an integer greater than or equal to 2) at the splitting unit 112, so as to generate the optical pulse sequences in N channels. Each split signal is given a delay time and an amplitude that are prescribed for each communication channel at a delay and amplitude control unit 113, and encoded as an optical signal by a modulator 114 provided for each communication channel.

Then, all the communication channels are coupled by the multiplexing unit 12 to generate the optical multiplexed signals.

Figure 3:
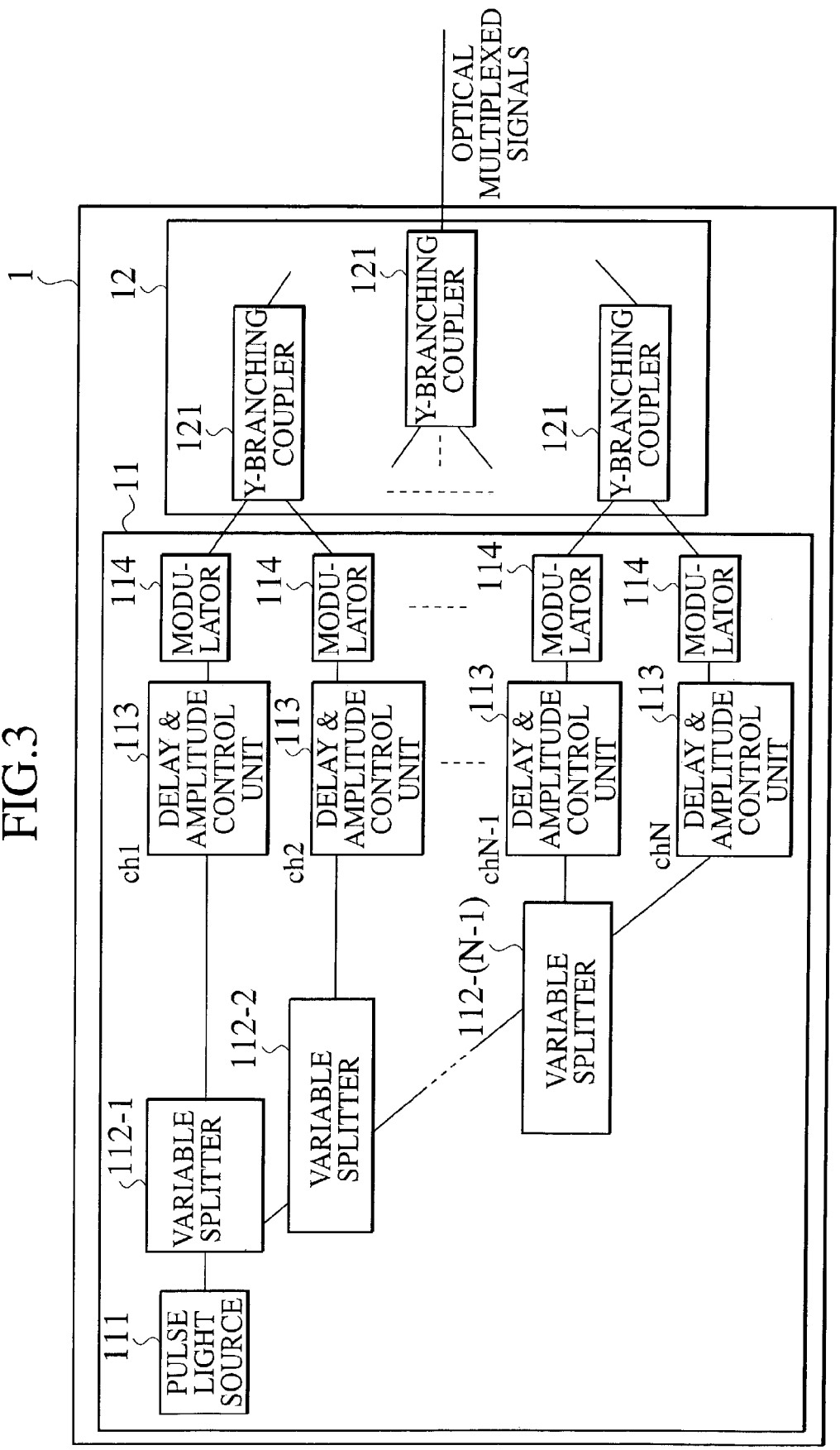
FIG. 3 is a block diagram showing a second exemplary configuration of an optical signal multiplexing device according to the first embodiment of the present invention.

FIG. 3 shows another exemplary configuration of the optical signal multiplexing device 1. The optical signal multiplexing device 1 of FIG. 3 is directed to the case where the N optical pulse sequences are generated by using variable splitters 112 at N−1 stages.

The amplitudes of the optical pulse sequences are determined by the split ratios of the variable split ratio couplers 112. For Example, when the split ratios of the variable split ratio couplers 112-1 to 112-(N−1) are all set to be 1:1 and the intensity of the pulses split by the first variable split ratio coupler 112-1 is assumed to be one, the intensity of the pulses split by the next variable split ratio coupler 112-2 will be ½, the intensity of pulses split next will be ¼, and so on so that the intensity becomes weaker by ½ every time the pulses are split.

For the variable split ratio coupler 112, it is possible to use a Mach-Zehnder interferometer which is fabricated on a glass substrate (PLC: Planar Lightwave. Circuit) and in which the coupling rate can be varied by the Thermo-Optic (TO) effect. In this case, the coupling rate is varied as the refractive index of the glass is changed by the heat. According to the actual measurement, the delay lines in this case multiplexed the input light pulses at the delay time difference of approximately 0.78 ps and produced the ultra high speed signals of 1.28 Tbit/s.

Note that the variable split ratio coupler 112 is not necessarily limited to that described above, and it may have any configuration as long as the coupling rate can be controlled. For example, it is possible to use a configuration for carrying out the multiplexing without making the optical phase and the polarization direction to coincide such that the interferences among the optical signals do not occur at a time of the multiplexing, by using a conventional optical signal multiplexing device.

Each split signal has its delay time and amplitude controlled at a delay and amplitude control unit 113 provided for each communication channel, and is encoded as an optical signal at the respective modulator 114. Then, the optical multiplexed signals are generated by coupling the optical pulse sequences at the multiplexing unit 12 and transmitted.

FIG. 3 shows the case where the multiplexing unit 12 uses Y-branching couplers 121 each of which couples two pulse sequences. This Y-branching coupler 121 can have the same configuration as the variable split ratio coupler 112 described above. Also, it is not absolutely necessary for the multiplexing unit 12 to use a plurality of Y-branching couplers 121. More preferably, it is also possible to form the multiplexing unit 12 by using a device that can multiplex signals of N channels collectively.

Note also that the multiplexing unit 12 shown in FIG. 3 can be applied to the optical signal multiplexing device 1 of FIG. 1 described above or the optical signal multiplexing device 1 of FIG. 4 to be described below.

Figure 4:
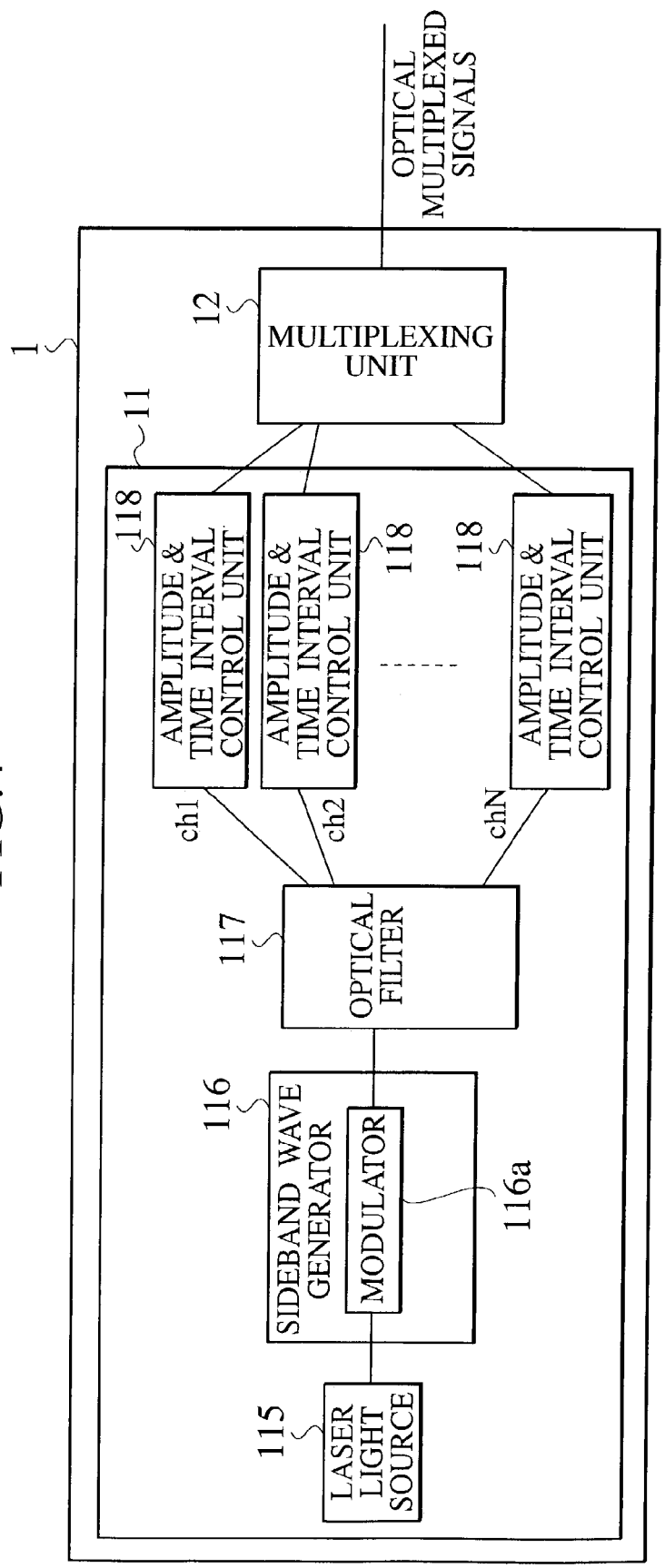
FIG. 4 is a block diagram showing a third exemplary configuration of an optical signal multiplexing device according to the first embodiment of the present invention.
Figure 5A:
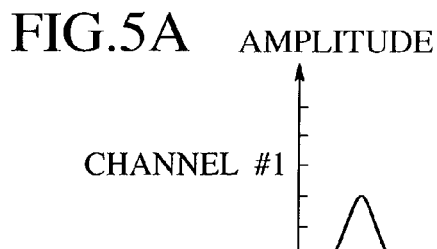
FIGS. 5A to 5D are graphs showing exemplary waveforms of four channels of optical pulse sequences to be multiplexed in the first embodiment of the present invention.
Figure 5B:
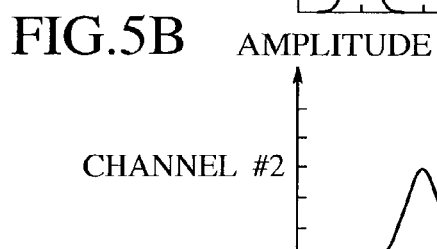
Figure 5C:
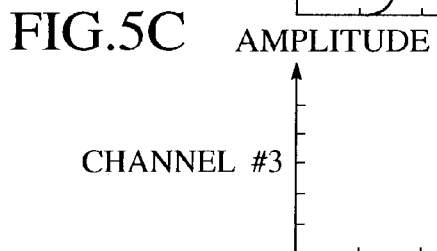
Figure 5D:
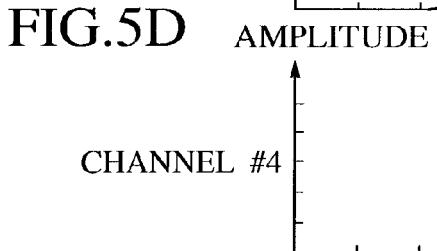

FIG. 4 shows a third exemplary configuration of the optical signal multiplexing device 1 according to this embodiment. In FIG. 4, the continuous light generated from a laser 115 that can generate the continuous light with an amplitude constant over the time is inputted into a sideband wave generator 116 formed by an optical resonator which is provided inside a modulator 116a, and then passed through an optical filter 117 to generate the optical pulse sequences. At each communication channel, the amplitude and the time interval of the optical pulse sequence are controlled by an amplitude and time interval control unit 118, and then the optical pulse sequences are multiplexed by the multiplexing unit 12 and transmitted.

FIGS. 5A to 5D and FIG. 6 shows an exemplary case of the multiplexing of the optical signals carried out by the optical signal multiplexing device 1 having the configuration as described above. Here, the exemplary case of having four communication channels will be described, but it should be obvious that the case of having any other number of communication channels is similar.

The four optical pulse sequences shown in FIGS. 5A to 5D are generated by the pulse sequence generation unit 11 described above, and have mutually different amplitudes and the identical period, i.e., the identical carrier frequency.

Figure 6:
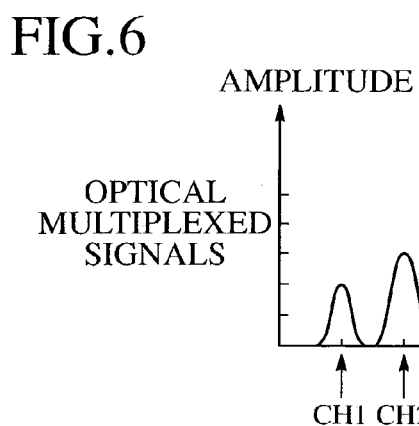
FIG. 6 is a graph showing an exemplary waveform of the optical multiplexed signals obtained by multiplexing the optical pulse sequences of FIGS. 5A to 5D in the first embodiment of the present invention.

FIG. 6 shows the optical multiplexed signals obtained by multiplexing these four optical pulse sequences on a time axis. In FIG. 6, those labeled as CH1 are the optical signals of the channel #1 shown in FIG. 5A, and similarly those labeled as CH2, CH3 and CH4 are the optical signals of the channels #2, #3 and #4 shown in FIGS. 5B, 5C and 5D, respectively.

As such, the optical multiplexed signals are formed by a plurality of optical pulse sequences having the identical carrier frequency, and the optical signal multiplexing device 1 carries out the control such that the pulse intensities become different for different communication channels by using the variable split ratio couplers 112 or the delay and amplitude control units 113.

Note that, in the case of carrying out the multiplexing at the multiplexing unit 12 in each exemplary configuration of the optical signal multiplexing device 1 described above, instead of the time division multiplexing on a time axis shown in FIG. 6, it is also possible to generate a plurality of optical multiplexed signals (first optical multiplexed signals) with mutually different carrier frequencies that are multiplexed on a time axis, and then generate second optical multiplexed signals obtained by further multiplexing the first optical multiplexed signals on a frequency axis.

Also, in the case of using the time interval of the optical pulses shorter than a time width (pulse width) of the optical pulses to be time division multiplexed, that is in the case where the optical pulses have overlaps on a time axis, the optical pulse sequences are controlled such that the optical pulse sequences have either the phases or the polarization directions or both mutually different for different communication channels, such that the light intensities will not be changed as a result of the interferences among the optical signals at a time of the multiplexing. For the purpose of this control, at least one of a phase control unit for controlling phases or a polarization control unit for controlling polarization directions is provided in the optical signal multiplexing device 1.

According to the optical signal multiplexing device of this embodiment as described above, it is possible to easily realize the communications using the optical multiplexed signals of a large capacity realized by a large number of multiplexing N, by multiplexing a plurality of optical pulse sequences having the identical carrier frequency while controlling them such that their intensities become different for different communication channels.

<Optical Multiplexed Signal Demultiplexing Device 3>

Figure 7:
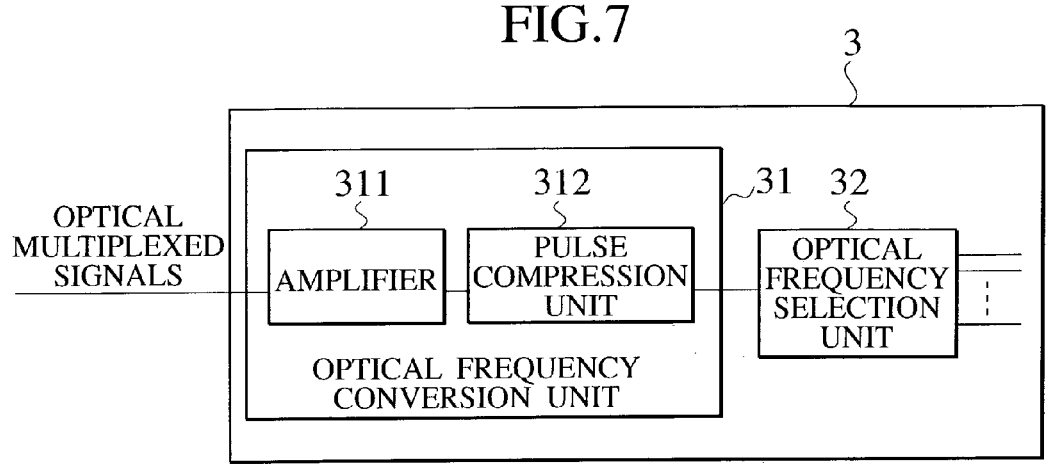
FIG. 7 is a block diagram showing an exemplary configuration of an optical multiplexed signal demultiplexing device according to the first embodiment of the present invention.

FIG. 7 shows an exemplary configuration of the optical multiplexed signal demultiplexing device 3 according to this embodiment. The optical multiplexed signal demultiplexing device 3 of FIG. 7 has an optical frequency conversion unit 31 having an optical nonlinear medium which changes a central wavelength according to a pulse intensity of the input light as described above, and an optical frequency selection unit 32 capable of demultiplexing the optical signals according to their frequencies (wavelengths).

The optical frequency conversion unit 31 is formed by an amplifier 311 for amplifying the amplitude levels of the input optical signals, and a pulse compression unit 312 for compressing the time widths (pulse widths) of the optical signals. The pulse compression unit 312 can be formed by an optical nonlinear medium such as a dispersion shifting fiber.

When the optical multiplexed signals are inputted into the optical frequency conversion unit 31 through the optical transmission line 2, each pulse has its frequency shifted according to its intensity.

More specifically, the soliton self-frequency shift utilizing the optical Kerr effect (the frequency shift caused in the Raman soliton which is the optical pulse resulting from the induced Raman scattering, according to its light intensity) is caused. This phenomenon occurs as the very high speed operation (less than or equal to 1 ps=$10^{-12}$ sec.), and is caused as the short wavelength components contained in the optical pulse function as a pump for inducing the Raman gain due to the induced Raman scattering, to convert the soliton energy continuously into the long wavelength components. The amount of the frequency shift is inversely proportional to the fourth power of the pulse width T of the input pulse, i.e., $T^{-4}$. More specifically, the amount of frequency shift dλ (THz/km) and the pulse width T has the following relationship.

$$d\lambda = 0.0436/T^4 \quad (1)$$

Figure 8:
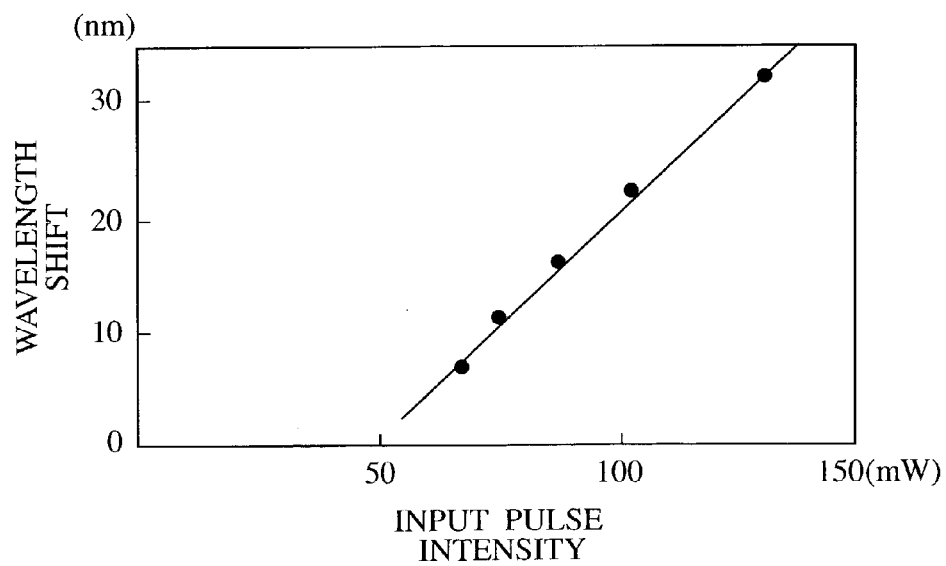
FIG. 8 is a graph showing a measurement result of a wavelength shift according to input pulse intensities at the optical multiplexed signal demultiplexing device according to the first embodiment of the present invention.

FIG. 8 shows the result of the experiment for inducing the frequency shift according to the intensity of the input optical signal by using the optical pulse sequence with 10 GHz clock rate and the pulse width of approximately 1 ps. In this experiment, the dispersion shifting fiber with a length of about 20 km was used as the optical nonlinear medium. From FIG. 8, it can be seen that the wavelength shift of several nm to several ten nm, and even as much as several hundred nm depending on the condition, is possible by changing the intensity of the input optical signal.

Note that the optical nonlinear medium used in this embodiment is not necessarily limited to the dispersion shifting fiber used in the above described experiment. Even in the case of using the optical fiber, its type and length must be optimized at each occasion according to the condition of the input light, and the zero dispersion wavelength (the wavelength at which the propagation speed becomes maximum) of the optical fiber must be shorter than the central wavelength of the input light in order to generate the soliton (pulse) in the optical fiber. Also, the wavelength dispersion of the optical fiber is required to be greater than or equal to 1 ps/nm/km at the central wavelength of the input light in order to cause the soliton self-frequency shift efficiently. This requirement is imposed because if the wavelength dispersion is small the four wave mixing which has a lower threshold than the soliton self-frequency shift would be induced and it would become difficult to cause the soliton self-frequency shift that can make the demultiplexing of the optical multiplexed signals easier.

Figure 9:
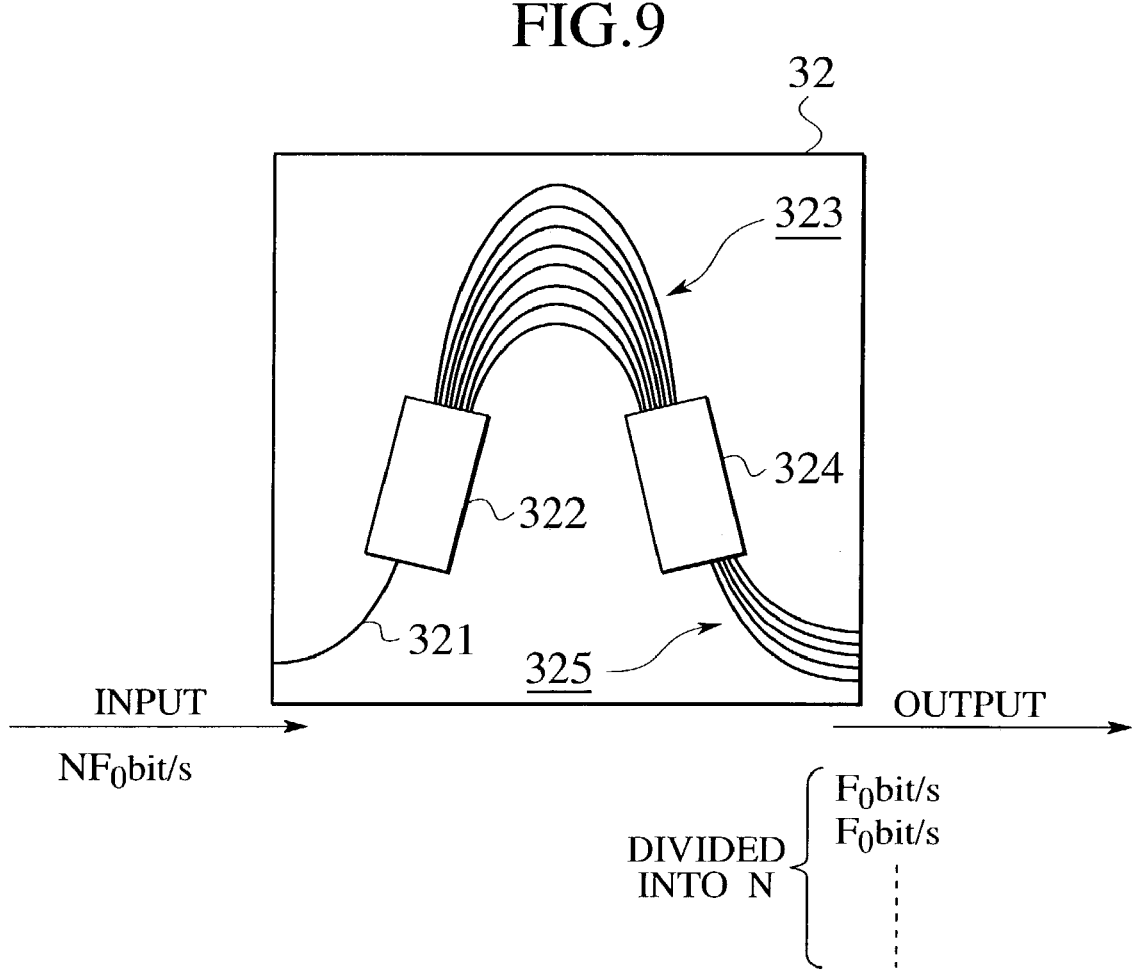
FIG. 9 is a diagram showing an exemplary configuration of an optical frequency selection unit in the optical multiplexed signal demultiplexing device according to the first embodiment of the present invention.

FIG. 9 shows an exemplary configuration of the optical frequency selection unit 32. The optical frequency selection unit 32 of FIG. 9 is an AWG (Arrayed Waveguide Grating) fabricated on a glass substrate (PLC), in which the optical multiplexed signals inputted from an input waveguide 321 are spatially diverged at a slab waveguide 322, and passed through an array waveguide 323. Then, they are spatially converged by a slab waveguide 324, and outputted from N output waveguides 325 as separate communication channels.

Note that the optical frequency selection unit 32 is not necessarily limited to the AWG described above, and it can be a multi-layer film filter as long as it is an optical filter having a frequency selection property, and the filter structure is also not necessarily limited to any specific filter structure.

As the optical multiplexed signals are formed by a plurality of optical pulse sequences having different intensities for different communication channels, the optical multiplexed signals to be outputted from the optical frequency conversion unit 31 are converted into the optical signals having different frequencies for different communication channels due to the soliton self-frequency shift described above, that is, they are outputted in the frequency division multiplexed state. By inputting these optical signals into the optical frequency selection unit 32 for separating the optical signal of each frequency, it becomes possible to demultiplex the received optical multiplexed signals into separate communication channels.

Figure 10:
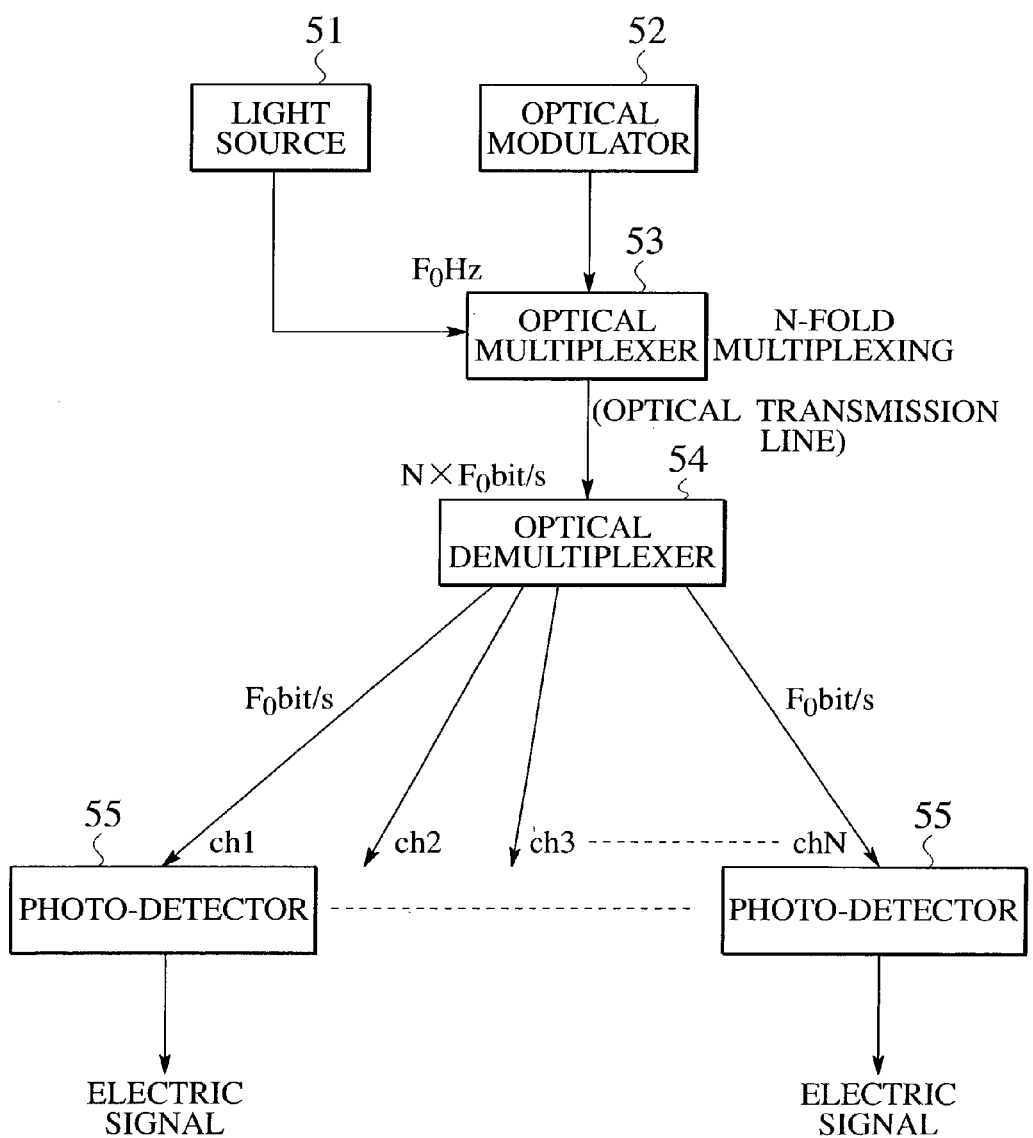
FIG. 10 is a block diagram showing one exemplary configuration of a conventional ultra high speed optical communication system.
Figure 11:
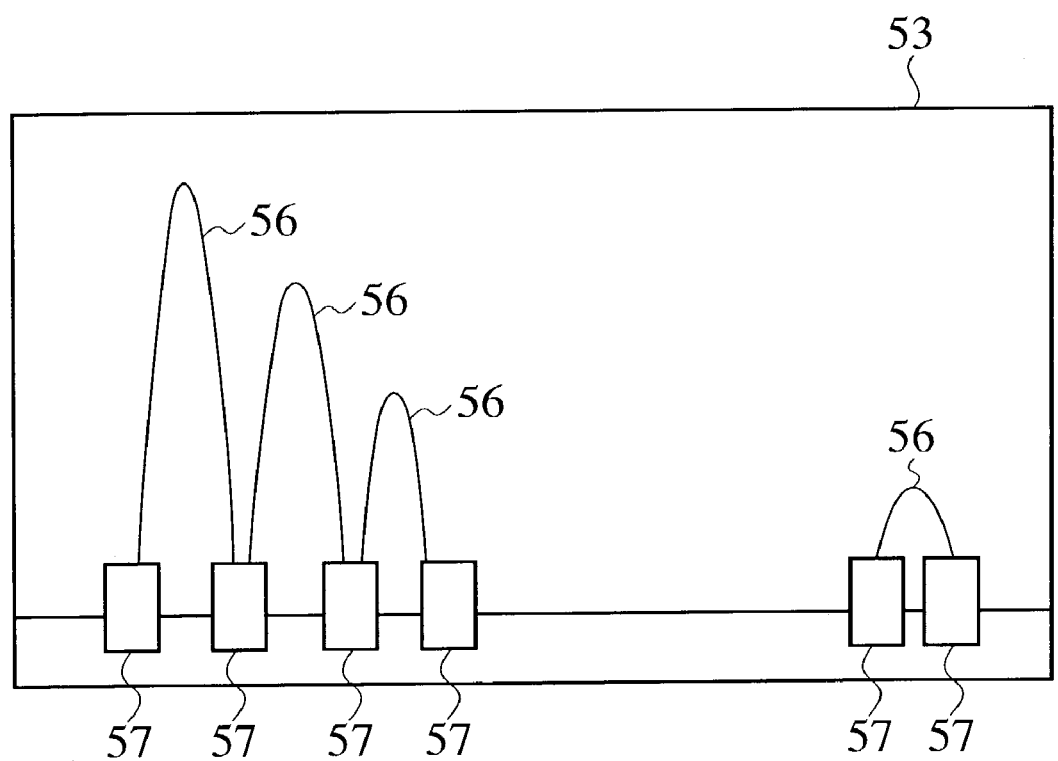
FIG. 11 is a diagram showing an exemplary configuration of a conventional optical signal multiplexing device.
Figure 12:
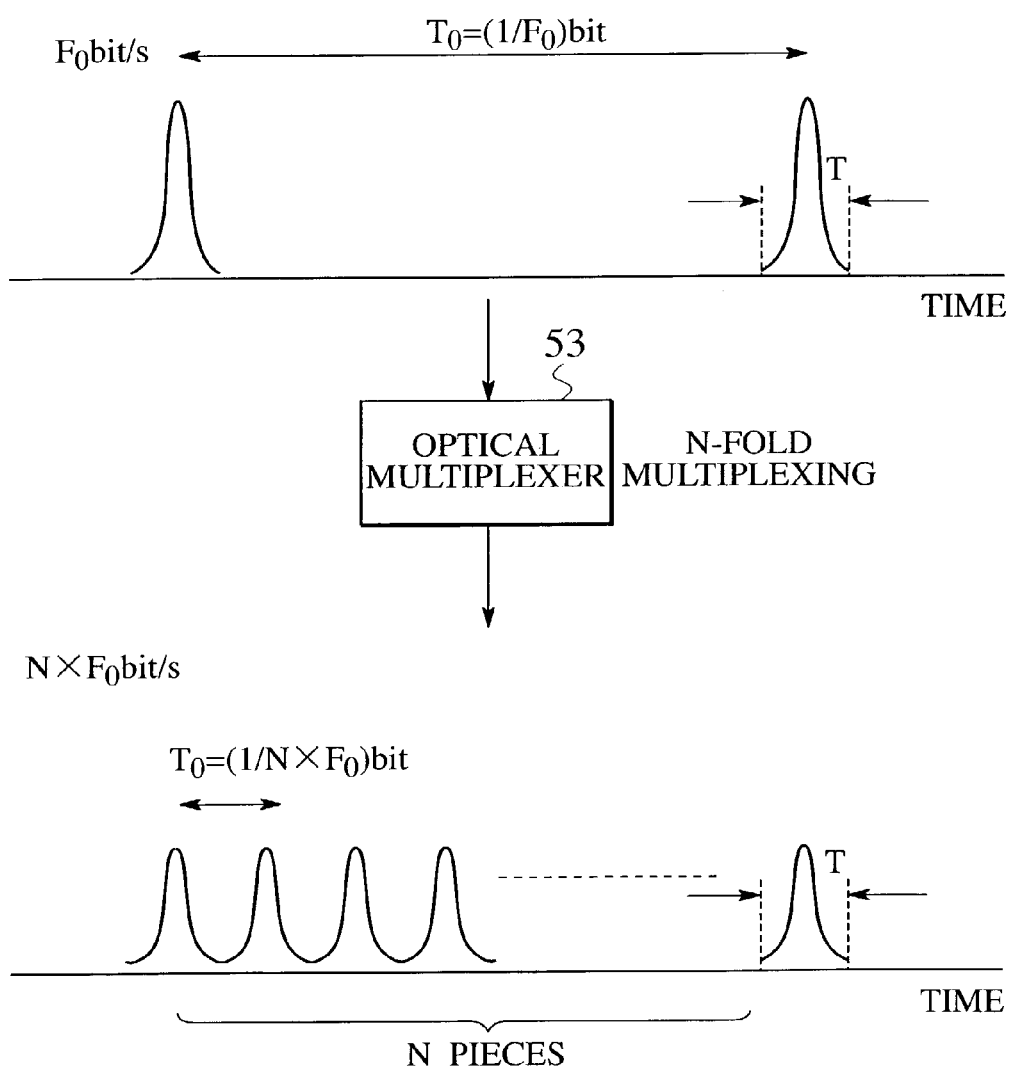
FIG. 12 is a diagram schematically showing a conventional optical signal multiplexing.
Figure 13:
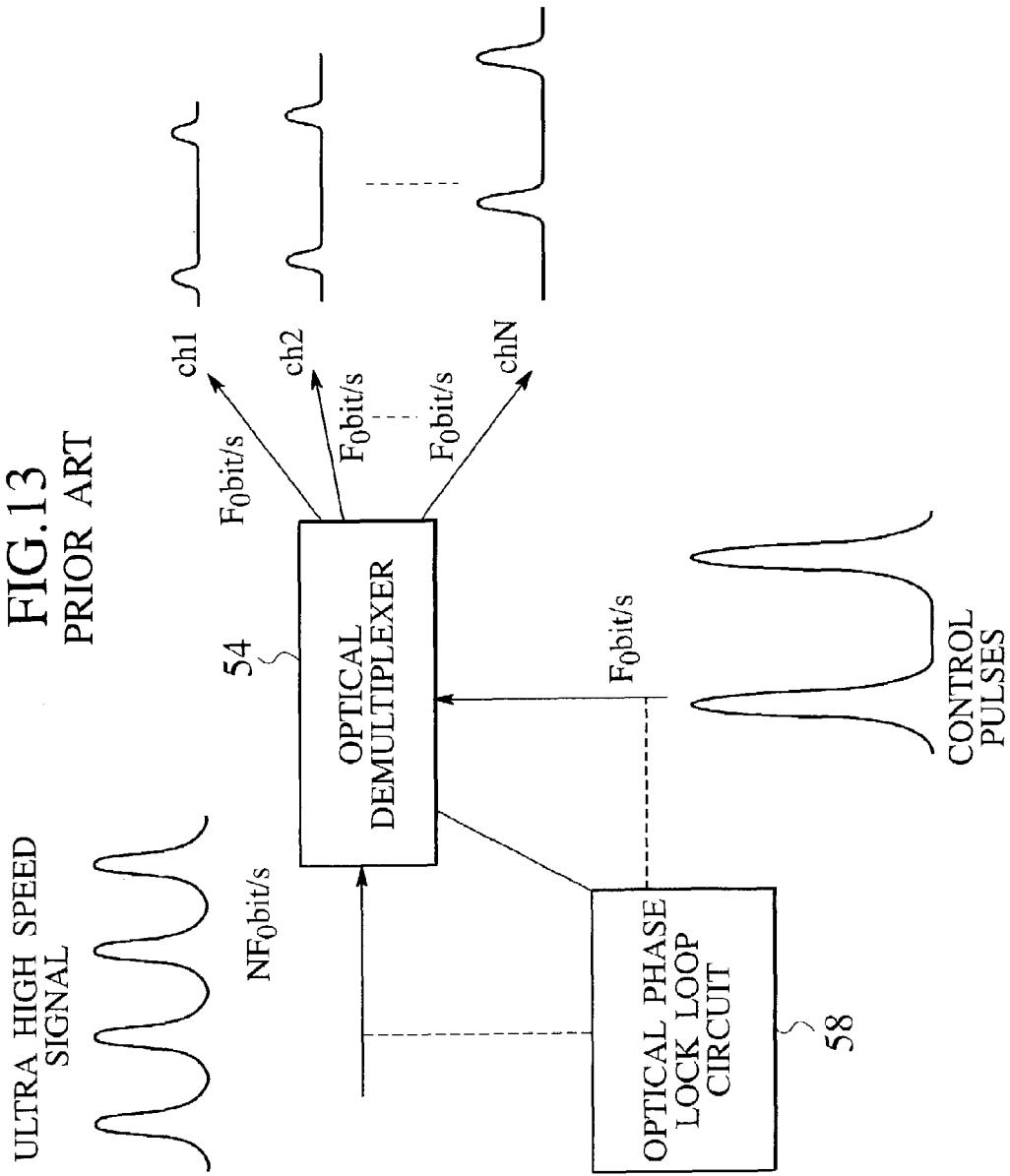
FIG. 13 is a diagram schematically showing a conventional optical multiplexed signal demultiplexing.
Figure 14:
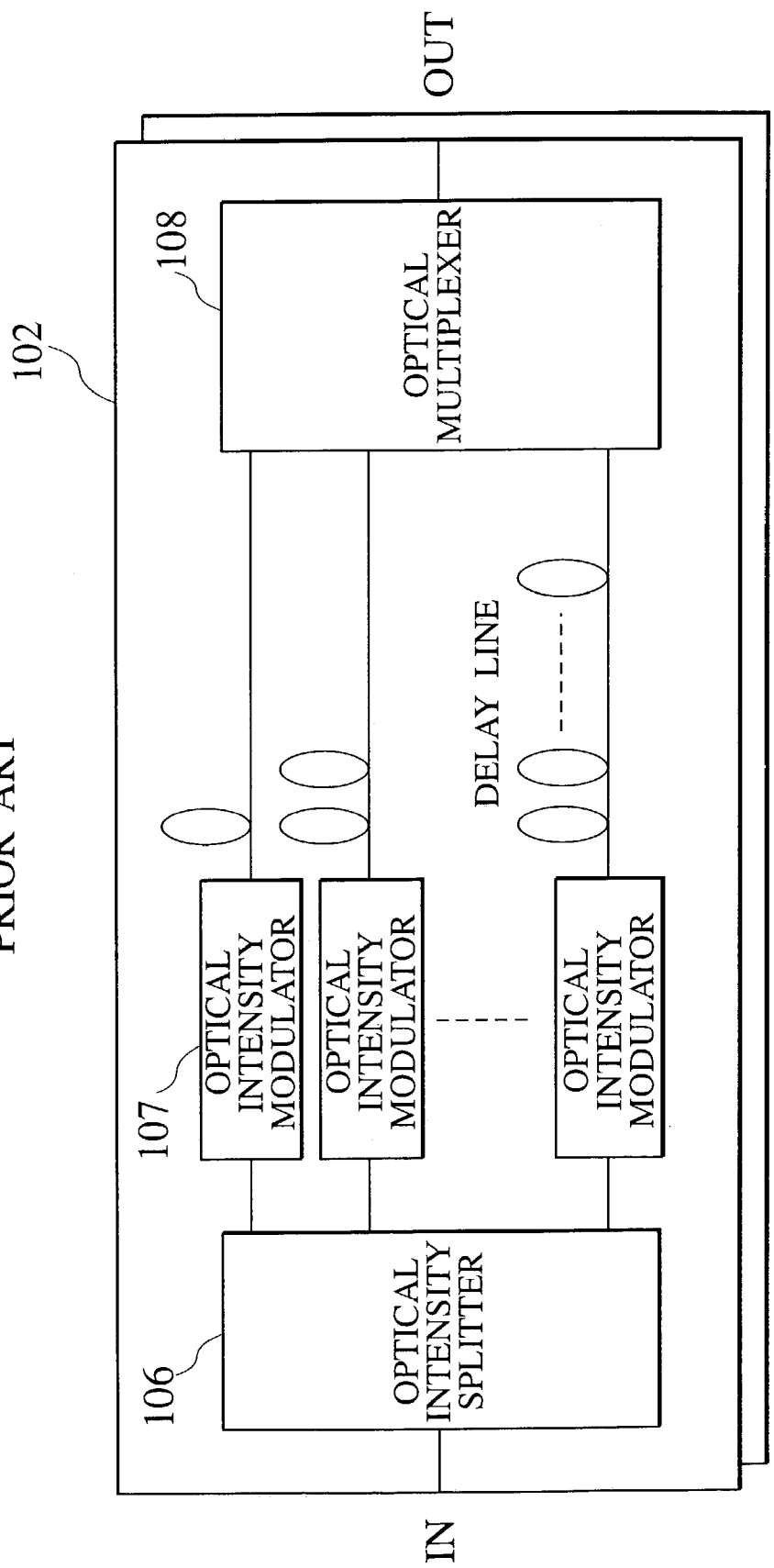
FIG. 14 is a diagram showing an exemplary configuration of a conventional optical time division multiplexer.
Figure 15:
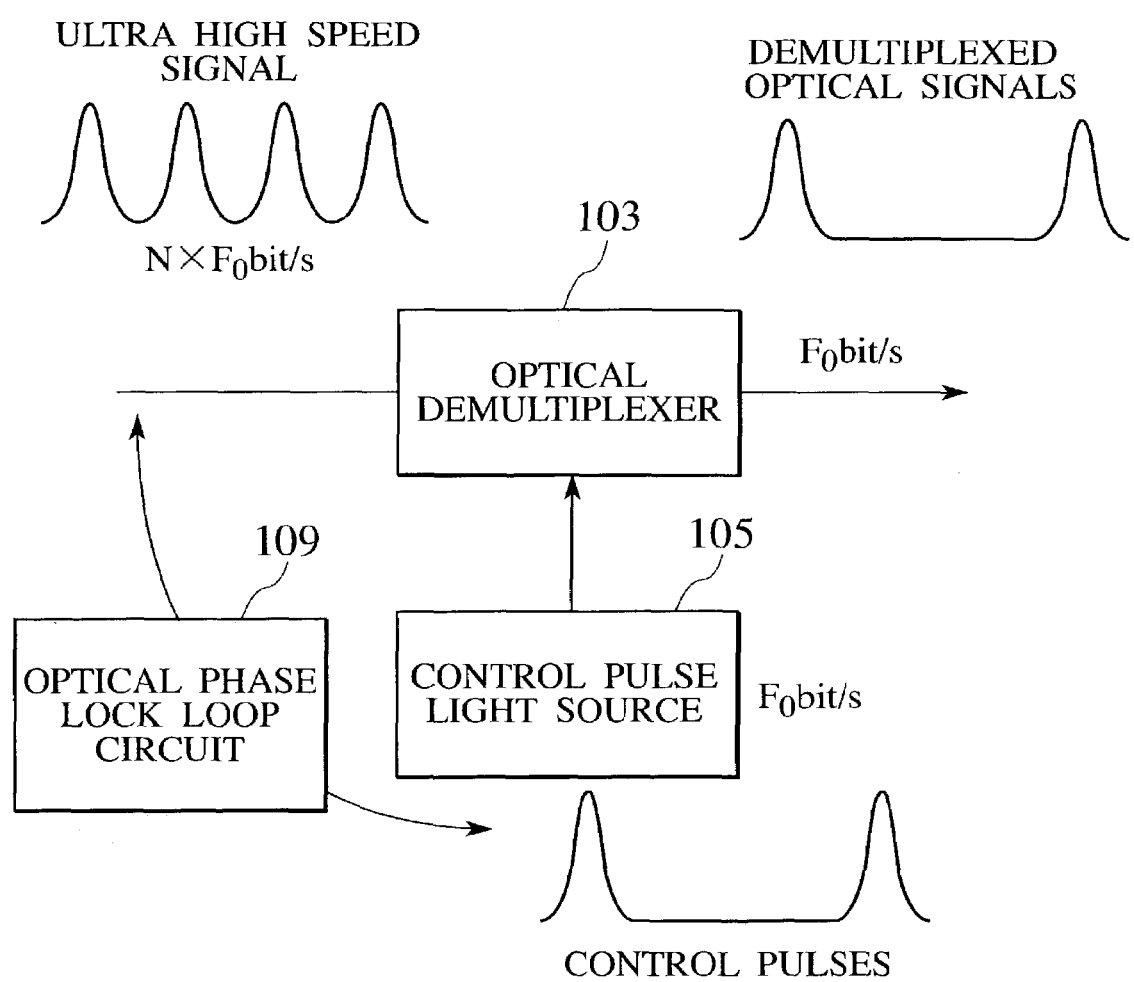
FIG. 15 is a diagram schematically showing the conventional signal demultiplexing of optical multiplexed signals.
Figure 16:
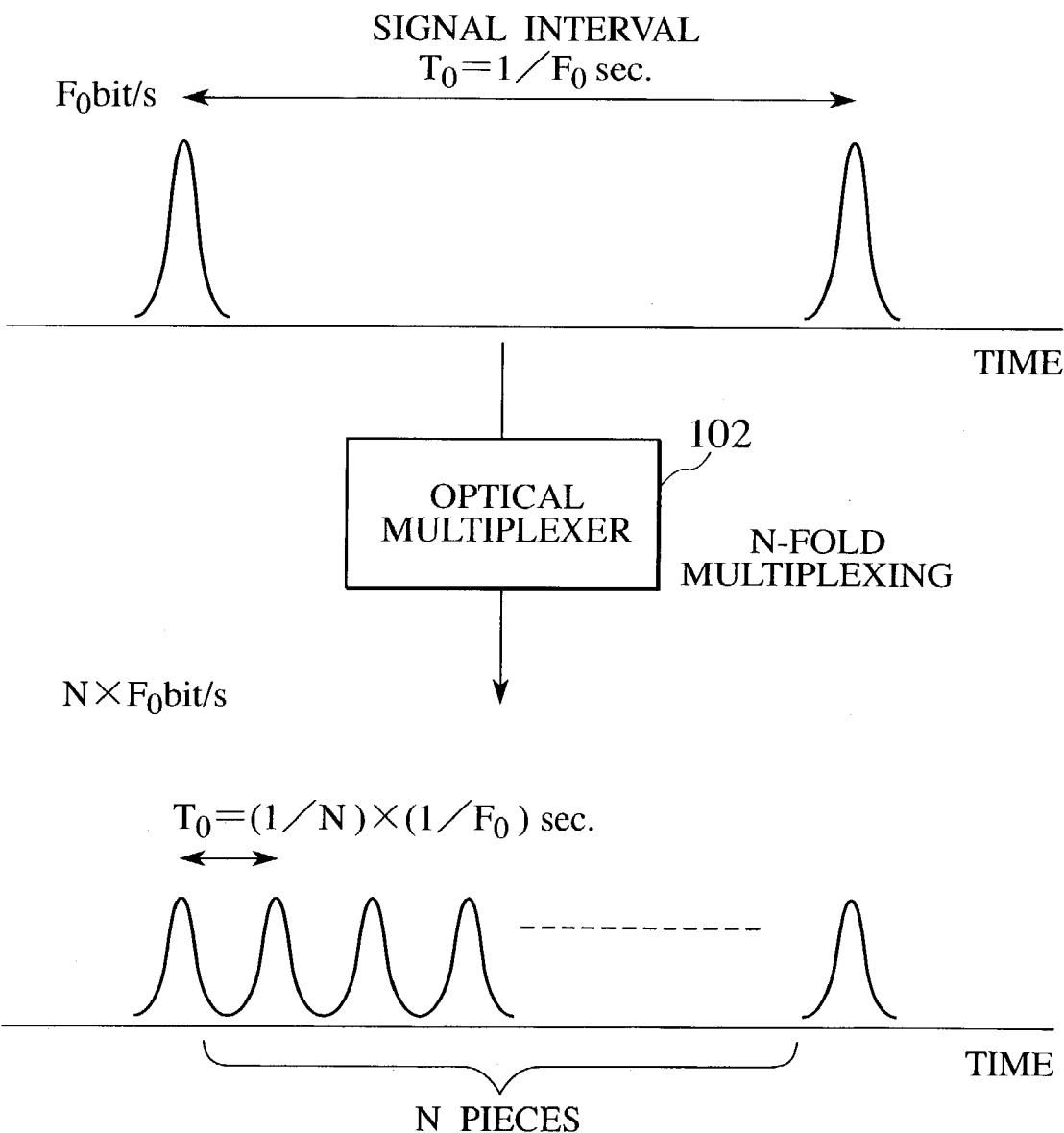
FIG. 16 is a diagram schematically showing the conventional optical multiplexed signal waveform.

The demultiplexed optical pulse sequences are converted into electric signals by the photo-detectors provided in correspondence to the communication channels, and processed electrically, similarly as in the case of FIG. 10.

The optical multiplexed signal demultiplexing device 3 described above has an asynchronous type configuration which does not require control signals from the external for the purpose of realizing the time division demultiplexing, so that it has a very simple configuration and it is possible to demultiplex the multiple communication channels collectively. In this way, it becomes possible to realize a highly functional system that could not have been realized by the prior arts such as the optical routing and the optical signal processing.

Also, the optical multiplexed signal demultiplexing device of this embodiment carries out its operation by using the soliton waves (optical pulse waves) which can be operated particularly stably among the optical nonlinear phenomena, so that it is possible to obtain the very stable optical signals.

As a result, it becomes possible to provide the optical multiplexed signal demultiplexing device which is extremely practical and having an application range extended over a wide range.

According to the first embodiment of the present invention described above, it is possible to provide the ultra high speed signals with pulse widths that can be easily transmitted, and a communication method using these signals, by suppressing interferences among signals at the optical signal multiplexing device, while enabling the multiplexing at the time width (pulse width) $T_\sigma$ of the optical signals which is wider than the time interval T between signals by using the asynchronous optical multiplexed signal demultiplexing device.

Also, the first embodiment uses the optical pulses having a single carrier frequency, so that the communication capacity can be further increased by using it in combination with the existing wavelength division multiplexing scheme.

As described, according to the first embodiment, it becomes possible to provide an optical multiplexing communication method, an optical multiplexing communication system, an optical signal multiplexing device and an optical multiplexed signal demultiplexing device capable of realizing the ultra high speed transmission using optical multiplexed signals with pulse widths that can be transmitted easily, at low cost.

Referring now to FIG. 17 to FIGS. 28A and 28B, the second embodiment of the present invention will be described in detail.

In the first embodiment described above, the amplitude (light intensity) differences among different communication channels in the optical multiplexed signals are produced at the optical signal multiplexing device side. In contrast, this second embodiment is directed to the case where the amplitude (light intensity) differences among different communication channels in the optical multiplexed signals are produced at the optical multiplexed signal demultiplexing device side.

Figure 17:
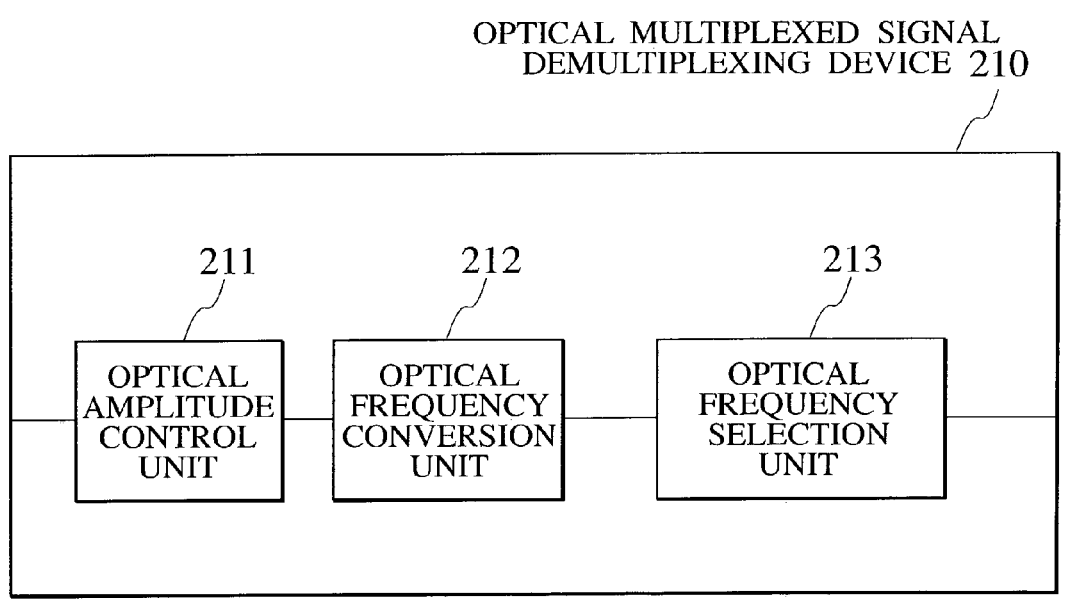
FIG. 17 is a block diagram showing an exemplary configuration of an optical multiplexed signal demultiplexing device according to the second embodiment of the present invention.

FIG. 17 shows an exemplary configuration of the optical multiplexed signal demultiplexing device according to the second embodiment. The optical multiplexed signal demultiplexing device of the second embodiment has an asynchronous type configuration which does not require the control pulse signals synchronized with the signal lights for the purpose of realizing the time division demultiplexing of signals. Consequently, its configuration is simple as shown in FIG. 17, which is formed by an optical amplitude control unit 211 for controlling the light intensities of the input signal, an optical frequency conversion unit 212 for converting wavelengths according to the light intensities of the signal, and an optical frequency selection unit 213 having a wavelength selection property.

At the optical frequency conversion unit 212, the soliton self-frequency shift or the frequency shift according to the light intensity due to the intra-pulse Raman scattering of Raman soliton, which utilizes the optical Kerr effect, is caused. This phenomenon is the very high speed operation so that the frequency shift occurs in less than or equal to 1 ps=$10^{-12}$ sec. The frequency shift is caused as the short wavelength components contained in the optical pulse function as a pump for inducing the Raman gain, to convert the soliton energy continuously into the long wavelength components.

Figure 18A:
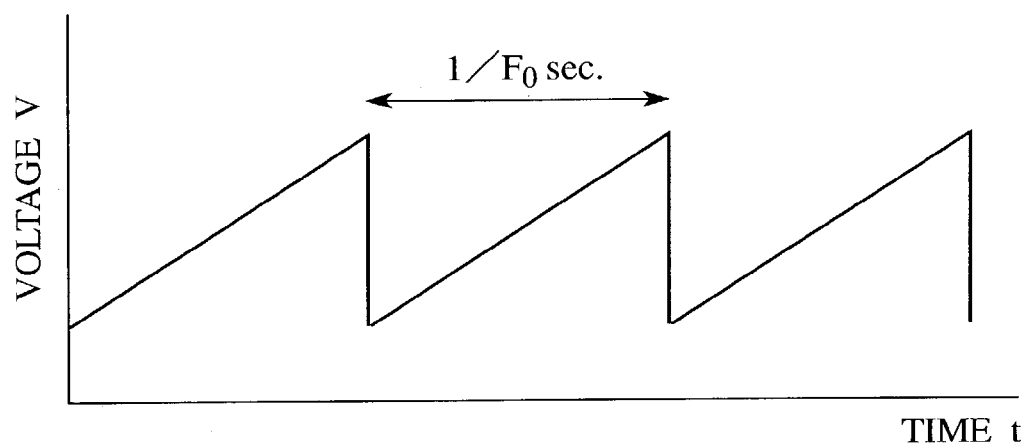
FIGS. 18A and 18B are graphs showing exemplary driving voltage waveforms for an optical intensity modulator used as an optical amplitude control unit in the optical multiplexed signal demultiplexing device according to the second embodiment of the present invention.
Figure 18B:
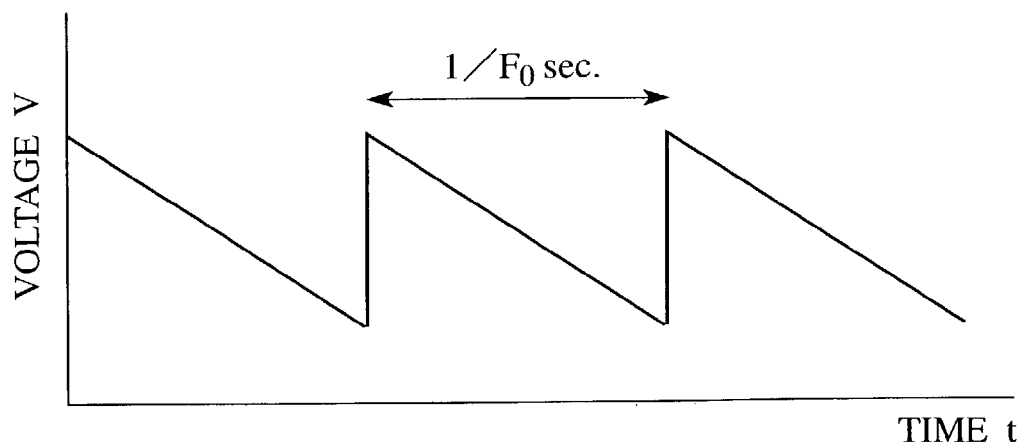
Figure 19A:
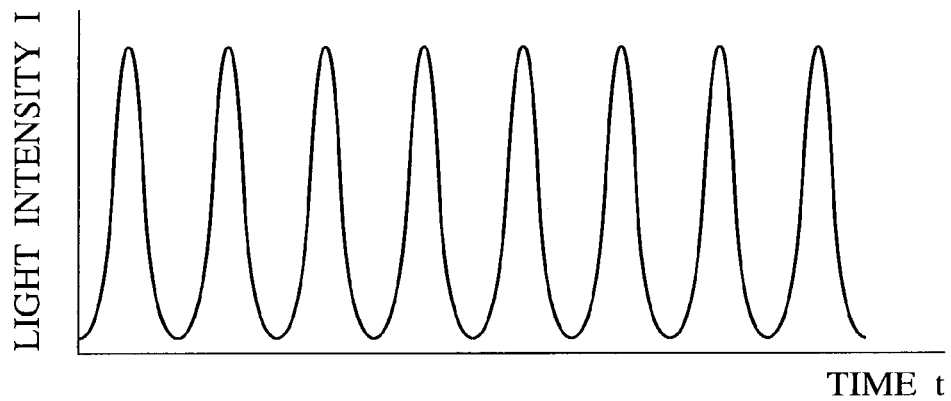
FIGS. 19A, 19B and 19C are graphs showing input and output signal waveforms of an optical intensity modulator used as an optical amplitude control unit in the optical multiplexed signal demultiplexing device according to the second embodiment of the present invention.
Figure 19B:
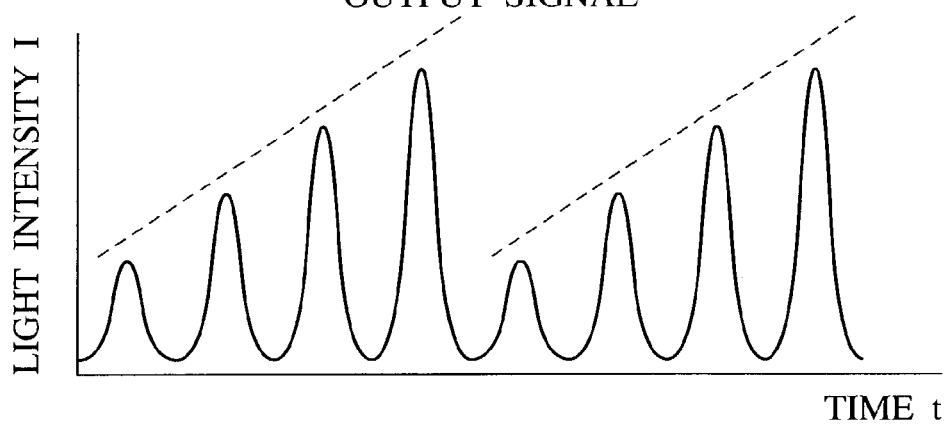
Figure 19C:
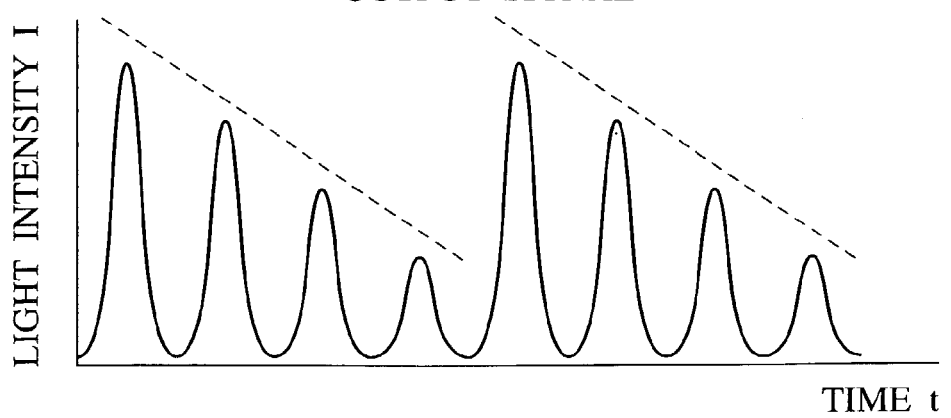

As a concrete example, the optical amplitude control unit 211 is formed by an optical intensity modulator. In this case, when the saw-tooth shaped modulation signals as shown in FIG. 18A or FIG. 18B are entered into the optical intensity modulator while the input signal lights as shown in FIG. 19A are inputted, the optical signals after passing the optical amplitude control unit 211 will have the intensity differences as shown in FIG. 19B or FIG. 19C, so that it is possible to control the light intensities. Note that the saw-tooth shaped modulation signals of FIG. 18A and FIG. 18B have the repetition frequency $F_\sigma$ which coincides with the frequency $F_\sigma$ of the signals to be demultiplexed.

Figure 20:
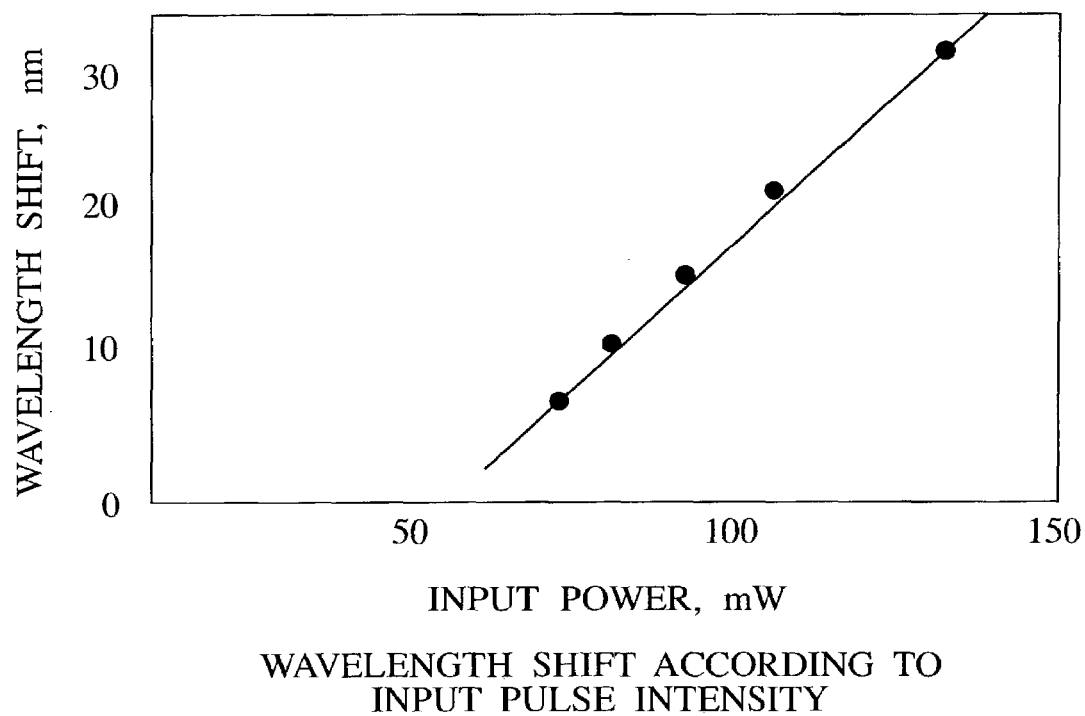
FIG. 20 is a graph showing a measurement result of a wavelength shift according to input pulse intensities at an optical frequency conversion unit in the optical multiplexed signal demultiplexing device according to the second embodiment of the present invention.

FIG. 20 shows the result of an experiment for controlling the conversion wavelength according to the light intensity. Here, the pseudo-random signals of 10 Gbit/s with the central wavelength of 1550 nm were used as the signal lights. From FIG. 20, it can be seen that the conversion wavelength can be controlled for 30 nm or more by changing the light intensity of the input light.

Figure 21A:
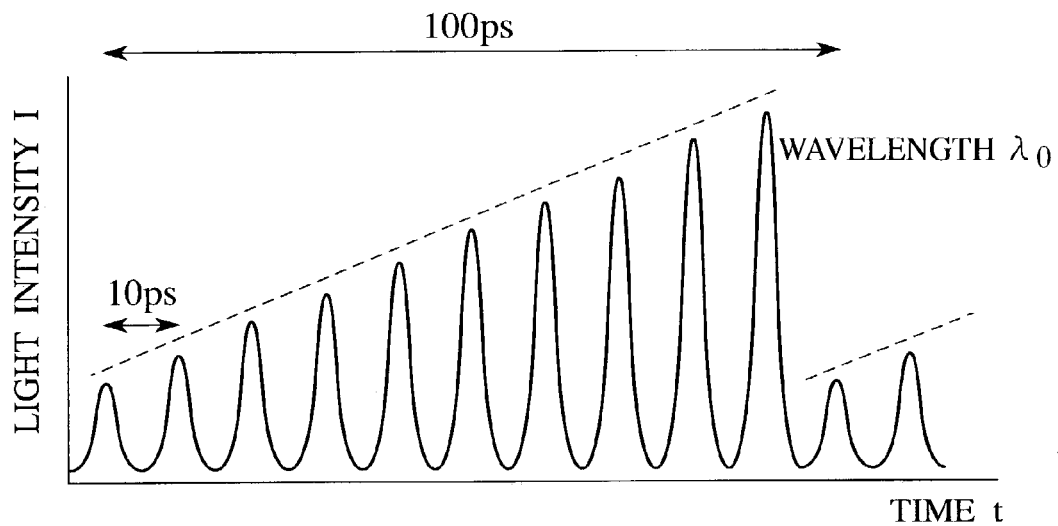
FIGS. 21A and 21B are graphs showing exemplary signal waveforms before and after demultiplexing in the optical multiplexed signal demultiplexing device according to the second embodiment of the present invention.
Figure 21B:
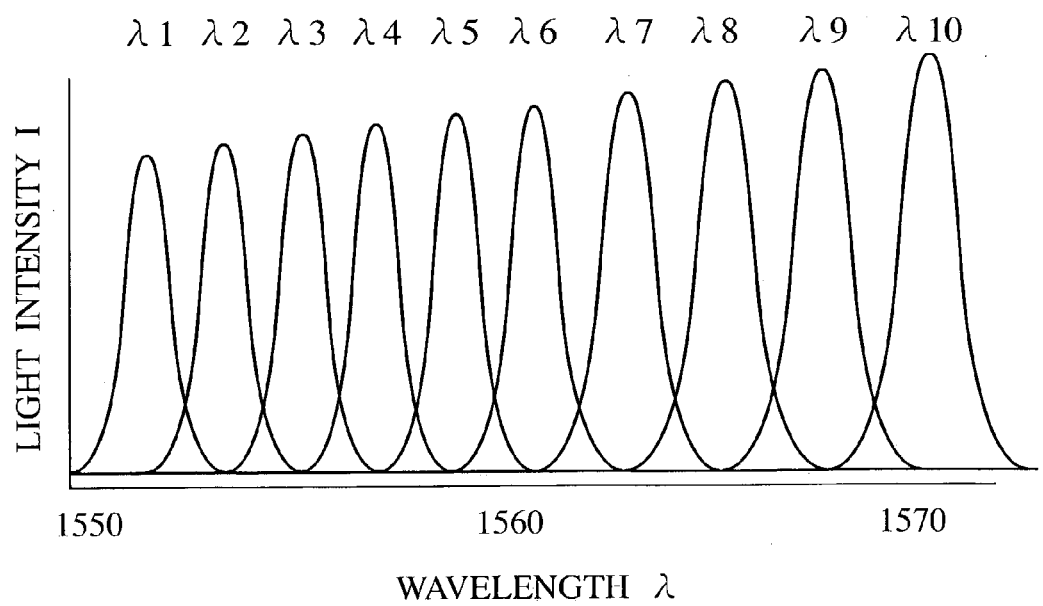

As a concrete example, when the repetition frequency of the signal lights before the multiplexing is 10 GHz (the central wavelength is 1550 nm) and the signal lights are optical time division multiplexed 10-folds to have 100 Gbit/s as shown in FIG. 21A and the repetition frequency $F_\sigma$ of the saw-tooth shaped modulation signals entered into the optical intensity modulator is 10 GHz, ten signals (with an interval of about 2 nm) of 10 Gbit/s with different wavelengths can be demultiplexed by the optical multiplexed signal demultiplexing device of this embodiment as shown in FIG. 21B.

Note that the frequency is not necessarily limited to that used in this example, and arbitrary frequency can be used. Also, the driving voltage waveform of the saw-tooth shaped modulation signals to be entered into the optical intensity modulator is not necessarily limited to that used in this example, and any waveform can be used as long as it is possible to control the light intensity of each one of the passing optical signals.

Figure 22A:
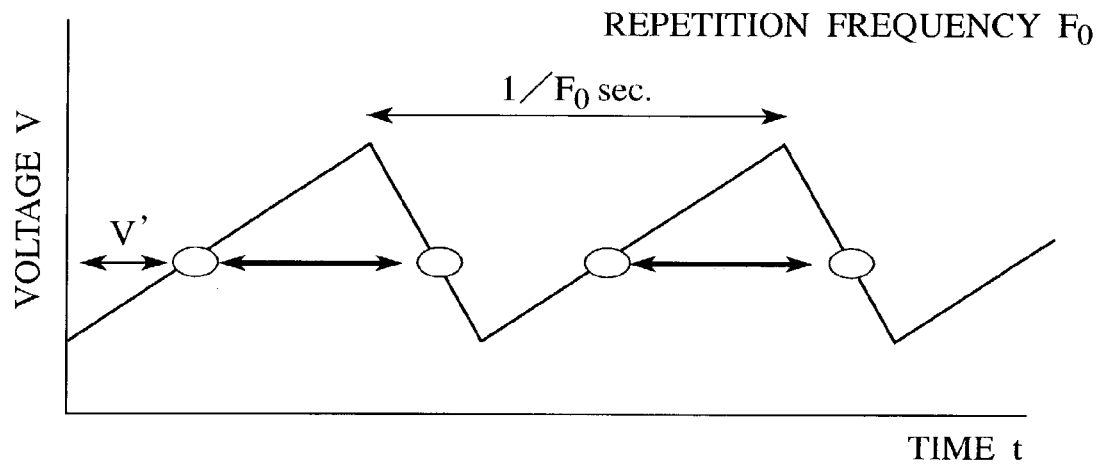
FIGS. 22A and 22B are graphs showing exemplary driving voltage waveform and output signal waveform of an optical amplitude control unit in the optical multiplexed signal demultiplexing device according to the second embodiment of the present invention.
Figure 22B:
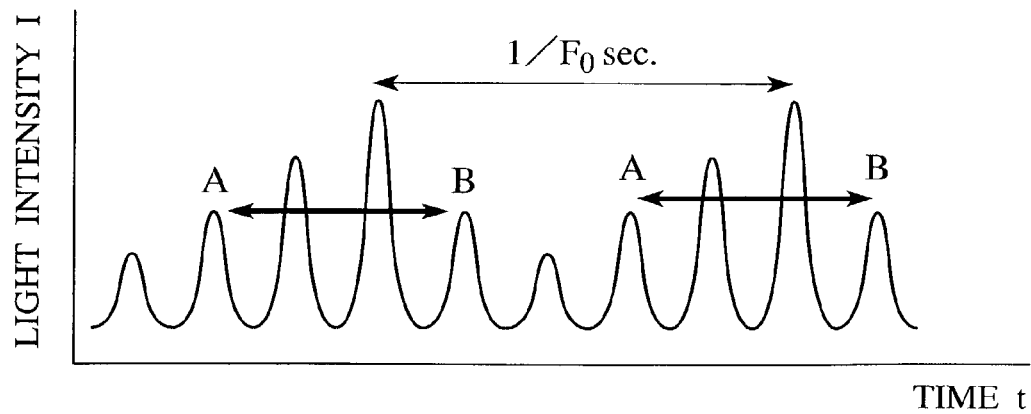
Figure 23A:
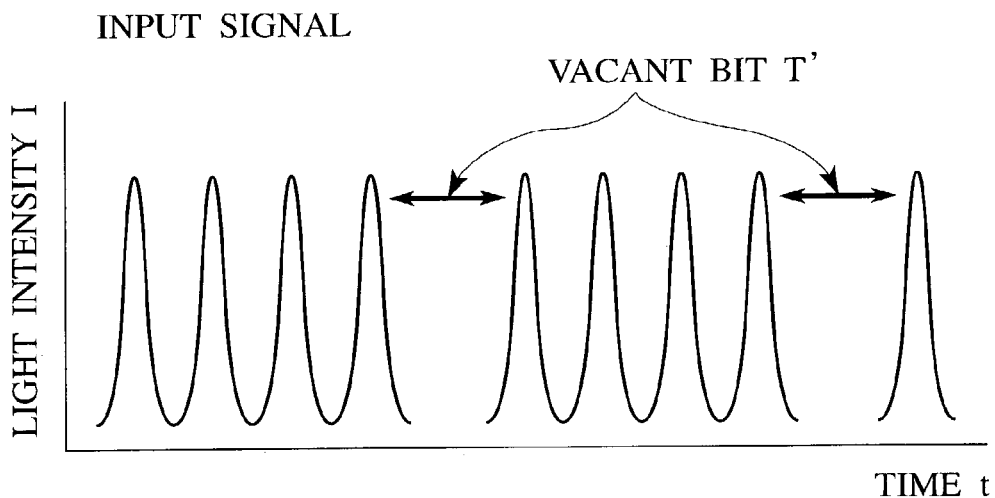
FIGS. 23A, 23B and 23C are graphs showing another exemplary input signal waveform, driving voltage waveform and output signal waveform of an optical amplitude control unit in the optical multiplexed signal demultiplexing device according to the second embodiment of the present invention.
Figure 23B:
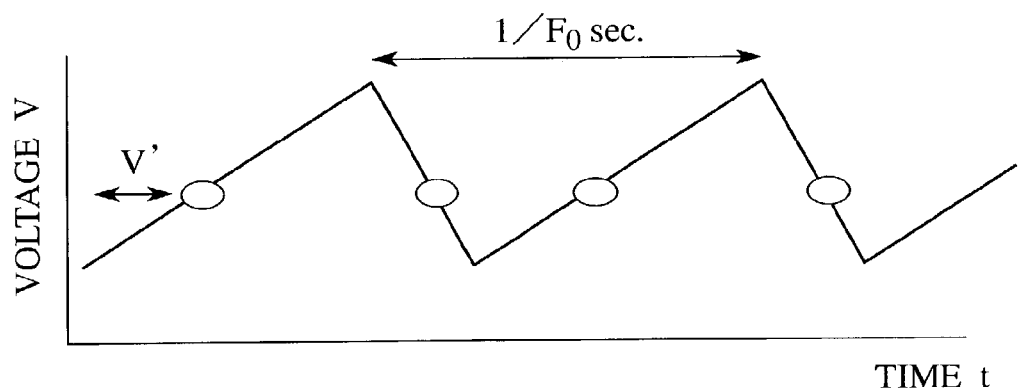
Figure 23C:
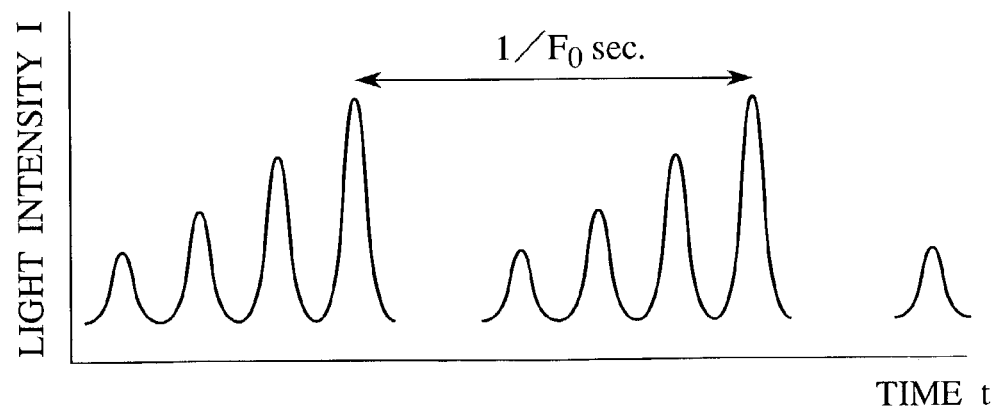

Also, if the driving voltage waveform of the saw-tooth shaped modulation signals to be entered into the optical intensity modulator has the same voltage values V' within one period of the waveform as shown in FIG. 22A, so that the signal bits A and B having the same amplitude occur in the optical signals after passing the optical intensity modulator as shown in FIG. 22B, the channel A and the channel B would be converted into the same wavelength at the optical frequency conversion unit 212 so that the signal demultiplexing would become difficult. In such a case, the signal demultiplexing can be made possible by periodically inserting vacant bits T' at a time of the optical time division multiplexing, as shown in FIGS. 23A, 23B and 23C.

Figure 24:
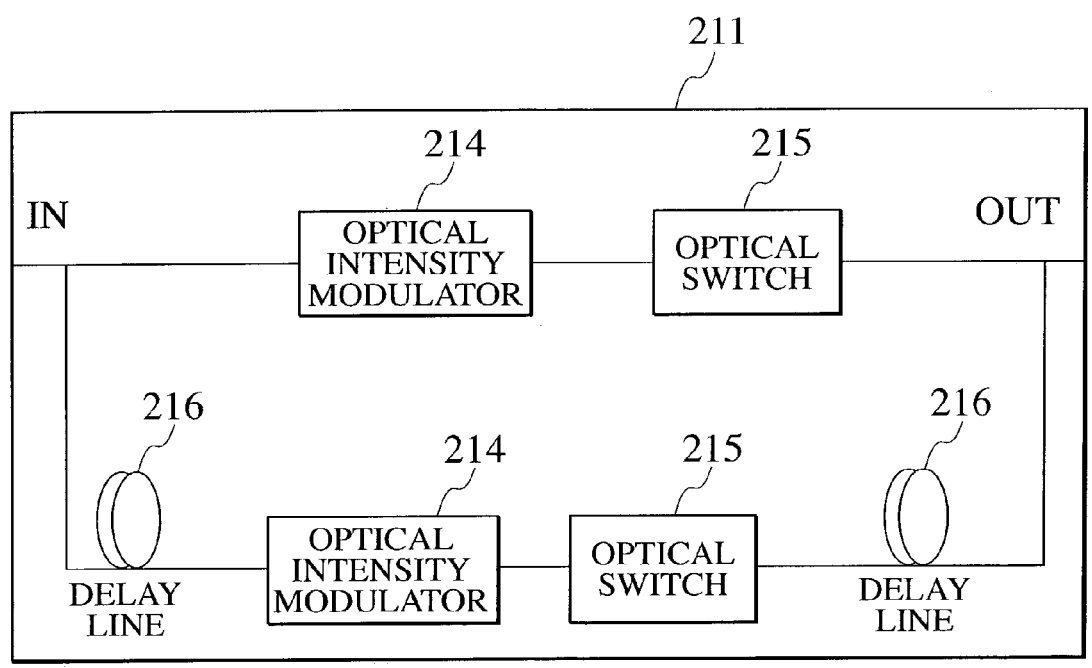
FIG. 24 is a block diagram showing an exemplary configuration of an optical amplitude control unit in the optical multiplexed signal demultiplexing device according to the second embodiment of the present invention.

Alternatively, as shown in FIG. 24, by splitting the multiplexed signals inputted into the optical amplitude control unit 211 into two, and using two sets of the optical intensity modulator and the optical switch, it is possible to prevent the optical signals after passing the optical intensity modulator to have the same amplitude. More specifically, the multiplexed signals are split into two, given a delay time difference, and inputted into the respective optical intensity modulators. Here, the delay time difference is set to be a half ($F_\sigma/2$) of one period of the repetition frequency $F_0$ Hz of the driving voltage waveform which drives the optical intensity modulator.

Figure 25A:
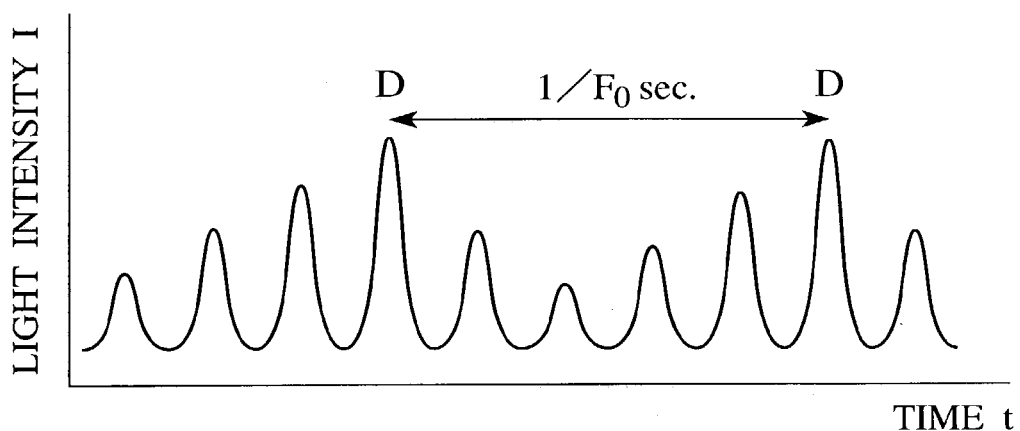
FIGS. 25A and 25B are graphs showing exemplary output signal waveforms of optical intensity modulators in the optical amplitude control unit of FIG. 24.
Figure 25B:
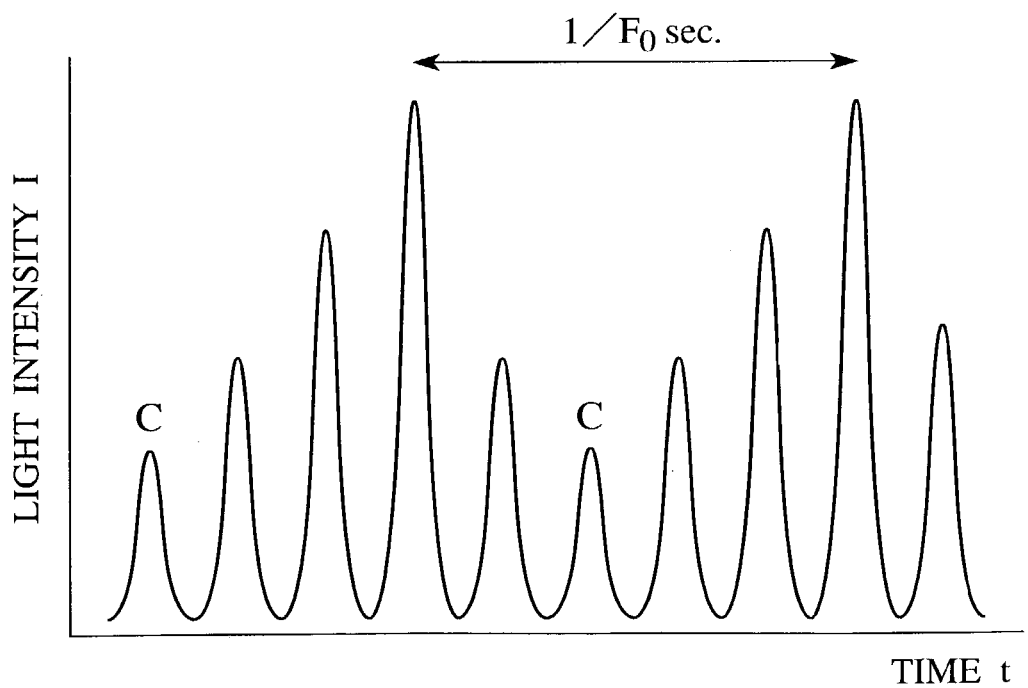

The two optical intensity modulators are operated by different driving voltages such as they have the transmission characteristics as shown in FIGS. 25A and 25B. At this point, the multiplexed signals to be passed through the optical intensity modulators are inputted with a half period displacement due to the delay line. Also, the transmission rates (driving voltages) are adjusted such that the light intensity of a C bit which has the lowest light intensity in the optical signals shown in FIG. 25B that passed the optical intensity modulator with a higher transmission rate becomes higher than the light intensity of a D bit which has the highest light intensity in the optical signals shown in FIG. 25A that passed the optical intensity modulator with a lower transmission rate.

Figure 26A:
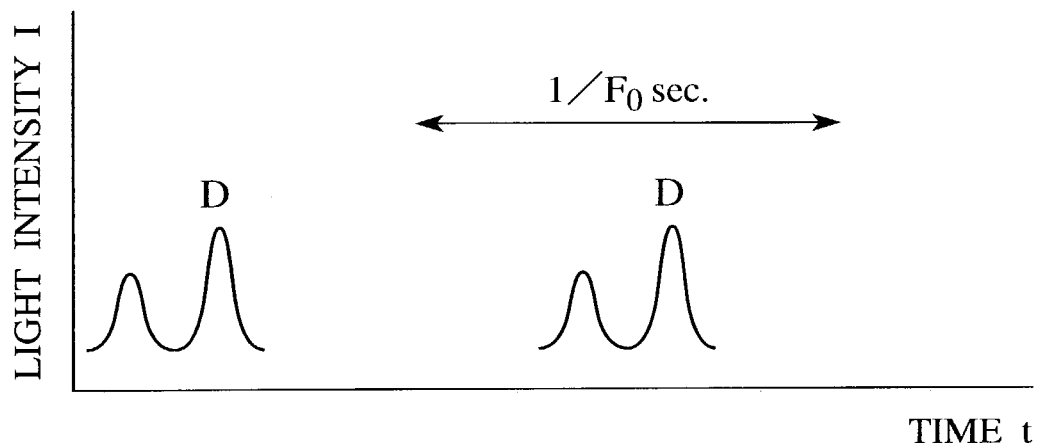
FIGS. 26A and 26B are graphs showing exemplary output signal waveforms of optical switches in the optical amplitude control unit of FIG. 24.
Figure 26B:
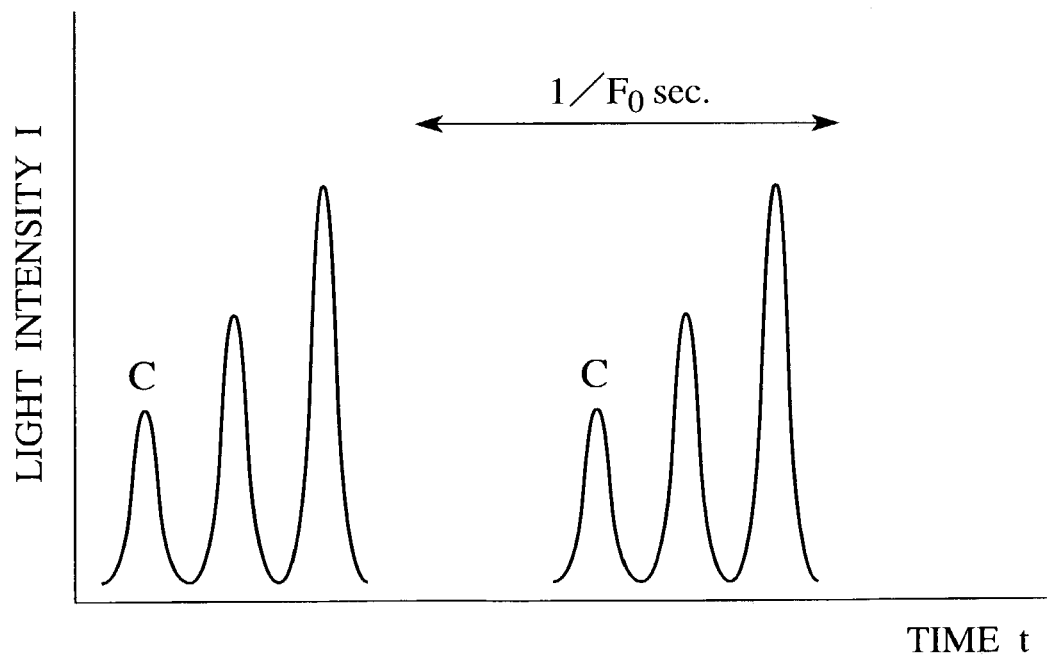
Figure 27:
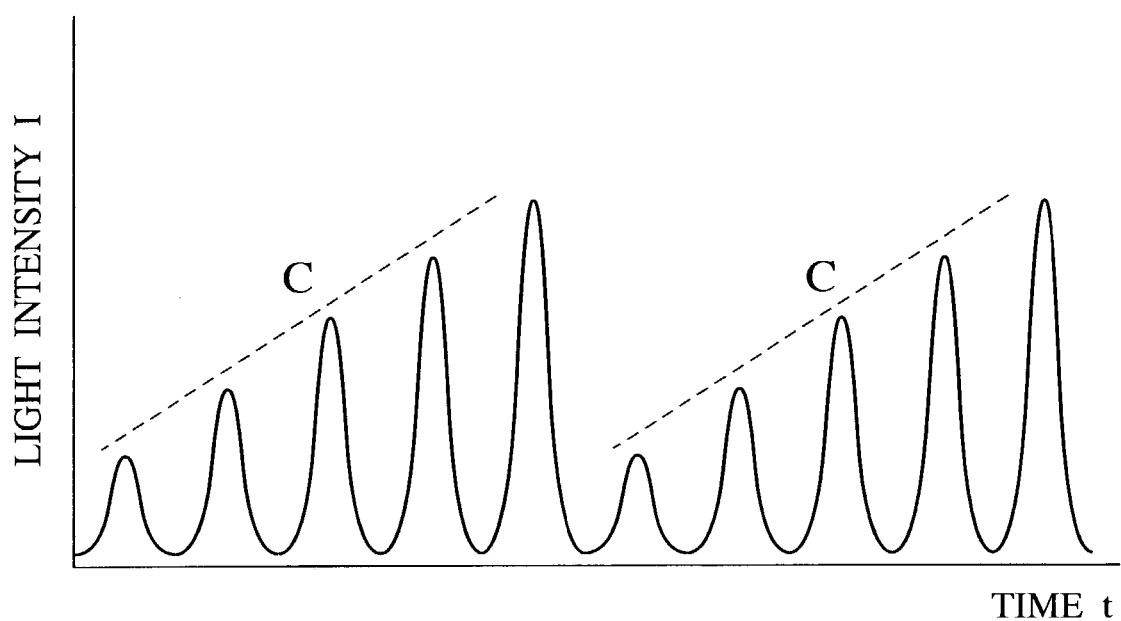
FIG. 27 is a graph showing an exemplary output signal waveform of the optical amplitude control unit of FIG. 24.

The optical signals with their light intensities controlled as they passed the optical intensity modulators are inputted into the respective optical switches, where as shown in FIGS. 26A and 26B, the optical signals of a half period of the modulation period of the optical intensity modulators are passed and the remaining optical signals are blocked. Then, the passed optical signals are combined by adjusting the timing by the delay line 216 as shown in FIG. 24, such that there is no optical signals with the same optical amplitude within the period of the demultiplexing as shown in FIG. 27. As a result, the demultiplexing into the low speed signals becomes possible by converting the wavelengths according to the light intensities at the optical frequency conversion unit 212.

Figure 28A:
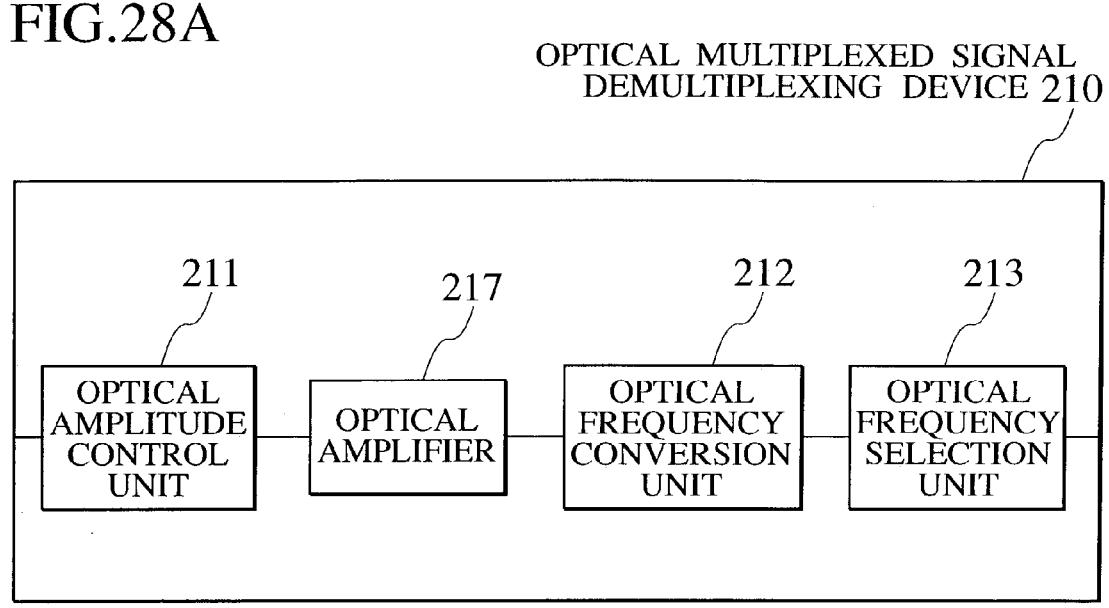
FIGS. 28A and 28B are block diagrams showing two modified configurations of an optical multiplexed signal demultiplexing device according to the second embodiment of the present invention.
Figure 28B:
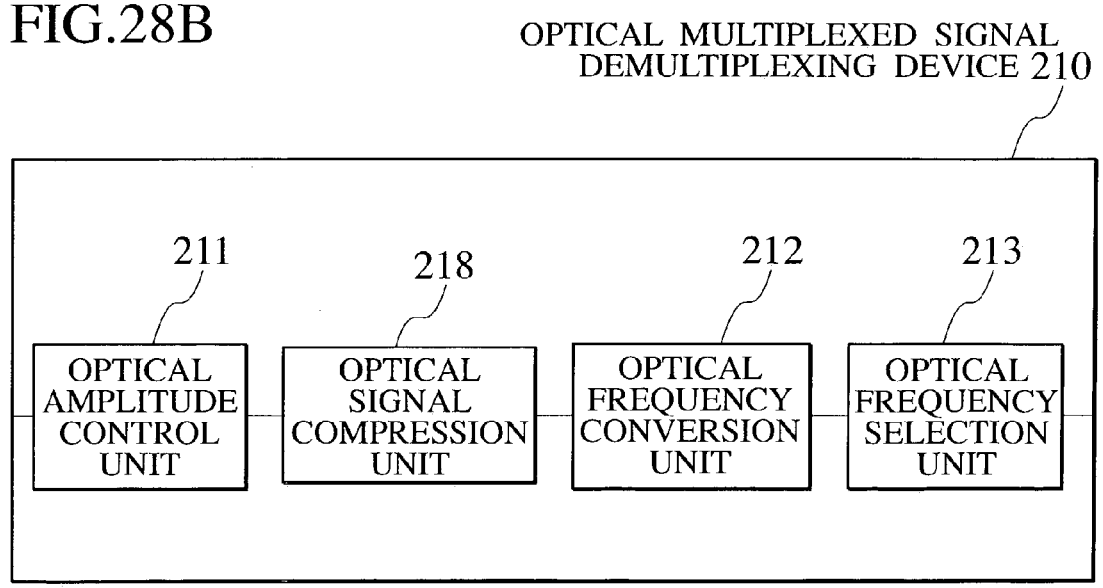

Note that the optical multiplexed signal demultiplexing device of the second embodiment can have a modified configuration as shown in FIG. 28A in which an optical amplifier 217 capable of amplifying only the overall signal level without changing the light intensity differences among the optical signals is inserted after the optical amplitude control unit 211, or a modified configuration as shown in FIG. 28B in which an optical signal compression unit 218 for compressing the time width (pulse width) of the optical signals is inserted before or provided inside the optical frequency conversion unit 212.

As described, according to the second embodiment, the optical multiplexed signal demultiplexing device can realize the asynchronous type ultra high speed optical signal demultiplexing which has been impossible to realize conventionally. Also, the optical multiplexed signal demultiplexing device of this embodiment can demultiplex the multiple channels collectively. In this way, it becomes possible to realize a highly functional system that could not have been realized by the prior arts such as the optical routing and the optical signal processing.

Also, the optical multiplexed signal demultiplexing device of this embodiment carries out its operation by using the soliton which can be operated particularly stably among the optical nonlinear phenomena, so that it is possible to obtain the very stable optical signals.

As a result, it becomes possible to provide the optical multiplexed signal demultiplexing device which is extremely practical and having an application range extended over a wide range.

Figure 30:
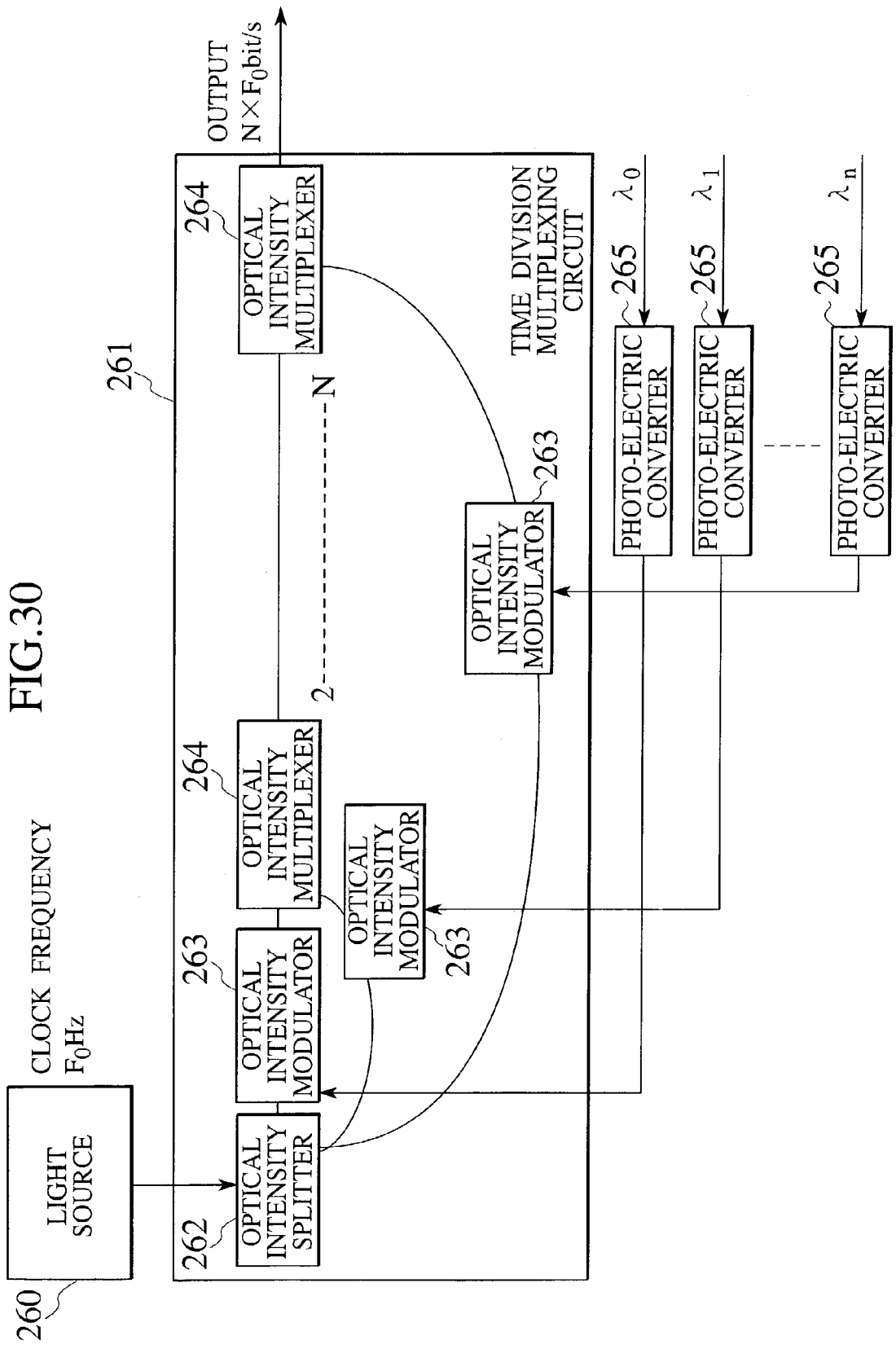
FIG. 30 is a block diagram showing an exemplary configuration of a signal multiplexer in the transmission and reception terminal of FIG. 29.

Referring now to FIG. 29 and FIG. 30, the third embodiment of the present invention will be described in detail.

In the first and second embodiments described above, the amplitude (light intensity) differences among different communication channels in the optical multiplexed signals are produced either at the optical signal multiplexing device side or at the optical multiplexed signal demultiplexing device side. In contrast, this third embodiment is directed to the case where the amplitude (light intensity) differences among different communication channels in the optical multiplexed signals are produced at a terminal to be located between the optical signal multiplexing device and the optical multiplexed signal demultiplexing device.

FIG. 29 shows an exemplary configuration of the optical multiplexing communication system according to the third embodiment. In this configuration, at a transmission and reception terminal 250 for distributing only necessary signals from a backbone network which is a backbone to the metropolitan network or the access network, an optical add/drop function capable of selectively receiving only the necessary signals (wavelength channels) among the demultiplexed optical signals, and multiplexing and transmitting new signals if necessary is provided. Here, the signals to be distributed to the metropolitan/access network can be the electric signals obtained by the conversion at a receiver or the optical signals to which no conversion is applied.

In this configuration, the signal demultiplexing is carried out at a signal demultiplexer 251 by the wavelength conversion capable of controlling the conversion wavelengths according to the light intensities of the signals, and the wavelength signals are separated by a wavelength separator 253, and these wavelength signals are inputted into respective optical switches 254. At the optical switch 254, the switching operation is carried out to input only the desired signal into a receiver 256. At this point, the switching of the optical path is not carried out at the optical switch 254 for the wavelength signals which are unnecessary to receive, and these wavelength signals are inputted into a signal multiplexer 252 through respective optical combiners 255. The signal multiplexer 252 maintains the timings of the wavelength signals that are demultiplexed so that the wavelength signals will not overlap on a time axis.

Also, when there are signals that are necessary to transmit from the transmission and reception terminal 250, the timings are extracted from the received signals by a timing extraction unit 258, the appropriate delay times are given such that they do not overlap with the other signals on a time axis, and these signals are inputted into the signal multiplexer 252 through the optical combiners 255. Here, at the transmission and reception terminal 250, if there is no signal received at the transmission and reception terminal 250, there is no vacant bits into which the new signals can be inserted without any overlap with the other signals on a time axis, so that the new signals cannot be transmitted. Consequently, there is provided a function for delaying the signal transmission timing until the signal receiving by the transmission and reception terminal 250.

FIG. 30 shows an exemplary configuration of the signal multiplexer 252. The signal multiplexer 252 of FIG. 30 is formed by a light source 260 having a central wavelength of $\lambda_\sigma$ and a clock frequency of $F_\sigma$ Hz, and a 1×N time division multiplexing circuit 261. The time division multiplexing circuit 261 is formed by one optical intensity splitter 262, N sets of optical intensity modulators 263 and optical intensity multiplexers 264 and (N−1) sets of delay lines of appropriate lengths. The optical intensity modulators 263 in the time division multiplexing circuit 261 can encode the pulse sequences from the light source 260 by inputting the electric signals obtained by photo-electric converters 265 from the optical signals that are demultiplexed by the signal demultiplexer 251 in the transmission and reception terminal 250 as the drivers of the optical intensity modulators 263. In this way, it becomes possible to produce and transmit new optical multiplexed signals of the same wavelengths and the same clock frequency as the optical multiplexed signals inputted into the transmission and reception terminal 250.

It is possible for the third embodiment to achieve the same effects as the first and second embodiments described above.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An optical multiplexed signal demultiplexing device for demultiplexing optical multiplexed signals in which a plurality of optical signals having an identical carrier frequency are multiplexed, into the plural of optical signals, comprising:

an optical amplitude control unit configured to control light intensities of input optical signals to obtain the optical multiplexed signals having different amplitudes for different communication channels from the input optical signals in which a plurality of optical pulse sequences having an identical amplitude for all communication channels are multiplexed on a time axis;

an optical frequency conversion unit having an optical nonlinear medium that changes a refractive index according to light intensities of input lights, and configured to carry out a frequency conversion of the optical multiplexed signals having different amplitudes for different communication channels into a plurality of optical pulse sequences having different carrier frequencies for different communication channels; and an optical frequency selection unit configured to demultiplex the plurality of optical pulse sequences obtained by the frequency conversion into optical pulse sequences for different communication channels, by selectively separating optical signals according to frequencies.

2. The optical multiplexed signal demultiplexing device of claim 1, further comprising:

an amplification unit configured to amplify amplitude levels of the optical multiplexed signals, and input amplified optical multiplexed signals into the optical nonlinear medium.

3. The optical multiplexed signal demultiplexing device of claim 1, further comprising:

a compression unit configured to compress pulse widths of the optical pulse sequences.

4. The optical multiplexed signal demultiplexing device of claim 1, wherein the optical nonlinear medium is an optical fiber having a zero dispersion wavelength at which a propagation speed becomes maximum which is shorter than a central wavelength of the optical pulse sequences, and a wavelength dispersion greater than or equal to +1 ps/nm/km at the central wavelength of the optical pulse sequences.

5. The optical multiplexed signal demultiplexing device of claim 1, further comprising:

an optical amplification unit, provided between the optical amplitude control unit and the optical frequency conversion unit, and configured to amplify the optical multiplexed signals obtained by the optical amplitude control unit while maintaining ratios of the light intensities of the optical multiplexed signals.

6. The optical multiplexed signal demultiplexing device of claim 1, further comprising:
an optical signal compression unit, provided between the optical amplitude control unit and the optical frequency conversion unit or inside the optical frequency conversion unit, and configured to compress pulse widths of the optical multiplexed signals.

7. The optical multiplexed signal demultiplexing device of claim 1, wherein the optical amplitude control unit is formed by an optical intensity modulator.

8. An optical multiplexing communication method for carrying out communications of optical multiplexed signals in which a plurality of optical signals having an identical carrier frequency are multiplexed, through an optical transmission line, comprising the steps of:
(a) generating a plurality of optical pulse sequences having an identical amplitude for all communication channels at an optical signal multiplexing device;
(b) generating the optical multiplexed signals by multiplexing the plurality of optical pulse sequences on a time axis, and transmitting the optical multiplexed signals at the optical signal multiplexing device;
(c) generating the optical multiplexed signals having different amplitudes for different communication channels at an optical multiplexed signal demultiplexing device, from the optical multiplexed signals received from the optical signal multiplexing device;
(d) carrying our a frequency conversion of the optical multiplexed signals having different amplitudes for different communication channels into a plurality of optical pulse sequences having different carrier frequencies for different communication channels, by using an optical frequency conversion unit having an optical nonlinear medium that changes a refractive index according to light intensities of input lights at the optical multiplexed signal demultiplexing device; and
(e) demultiplexing the plurality of optical pulse sequences obtained by the frequency conversion into optical pulse sequences for different communication channels, by using an optical frequency selection unit for selectively separating optical signals according to frequencies at the optical multiplexed signal demultiplexing device.

9. The optical multiplexing communication method of claim 8, wherein the step (d) uses the optical frequency conversion unit which also has a function for compressing pulse widths of the optical multiplexed signals.

10. An optical multiplexing communication method for carrying out communications of optical multiplexed signals in which a plurality of optical signals having an identical carrier frequency are multiplexed, through an optical transmission line, comprising the steps of:
(a) generating a plurality of optical pulse sequences having an identical amplitude for all communication channels at an optical signal multiplexing device;
(b) generating the optical multiplexed signals by multiplexing the plurality of optical pulse sequences on a time axis, and transmitting the optical multiplexed signals at the optical signal multiplexing device;
(c) generating the optical multiplexed signals having different amplitudes for different communication channels at a terminal device provided on the optical transmission line between the optical signal multiplexing device and an optical multiplexed signal demultiplexing device, from the optical multiplexed signals received from the optical signal multiplexing device;
(d) carrying out a frequency conversion of the optical multiplexed signals having different amplitudes for different communication channels into a plurality of optical pulse sequences having different carrier frequencies for different communication channels, by using an optical frequency conversion unit having an optical nonlinear medium that changes a refractive index according to light intensities of input lights at the terminal device; and
(e) demultiplexing the plurality of optical pulse sequences obtained by the frequency conversion into optical pulse sequences for different communication channels, by using an optical frequency selection unit for selectively separating optical signals according to frequencies at the terminal device.

11. The optical multiplexing communication method of claim 10, wherein the step (d) uses the optical frequency conversion unit which also has a function for compressing pulse widths of the optical multiplexed signals.

12. An optical multiplexing communication system for carrying out communications of optical multiplexed signals in which a plurality of optical signals having an identical carrier frequency are multiplexed, comprising:
an optical signal multiplexing device configured to generate a plurality of optical pulse sequences having an identical amplitude for all communication channels, generate the optical multiplexed signals by multiplexing the plurality of optical pulse sequences on a tune axis, and transmit the optical multiplexed signals;
an optical transmission line for transmitting the optical multiplexed signals; and
an optical multiplexed signal demultiplexing device configured to receive the optical multiplexed signals transmitted through the optical transmission line, generate the optical multiplexed signals having different amplitudes for different communication channels from the optical multiplexed signals received from the optical signal multiplexing device, carry out a frequency conversion of the optical multiplexed signals having different amplitudes for different communication channels into a plurality of optical pulse sequences having different carrier frequencies for different communication channels, by using an optical frequency conversion unit having an optical nonlinear medium that changes a refractive index according to light intensities of input pulses, and demultiplex the plurality of optical pulse sequences obtained by the frequency conversion into optical pulse sequences for different communication channels, by using a optical frequency selection unit for selectively separating optical signals according to frequencies.

13. The optical multiplexing communication system of claim 12, wherein the optical multiplexed signal demultiplexing device uses the optical frequency conversion unit which also has a function for compressing pulse widths of the optical multiplexed signals.

14. An optical multiplexing communication system for carrying out communications of optical multiplexed signals in which a plurality of optical signals having an identical carrier frequency are multiplexed, comprising:
an optical signal multiplexing device configured to generate a plurality of optical pulse sequences having an identical amplitude for all communication channels, generate the optical multiplexed signals by multiplexing the plurality of optical pulse sequences on a time axis, and transmit the optical multiplexed signals;

an optical transmission line for transmitting the optical multiplexed signals; and a terminal device provided on the optical transmission line between the optical signal multiplexing device and the optical multiplexed signal demultiplexing device, configured to receive the optical multiplexed signals transmitted through the optical transmission line, generate the optical multiplexed signals having different amplitudes for different communication channels from the optical multiplexed signals received from the optical signal multiplexing device, carry out a frequency conversion of the optical multiplexed signals having different amplitudes for different communication channels into a plurality of optical pulse sequences having different carrier frequencies for different communication channels by using an optical frequency conversion unit having an optical nonlinear medium that changes a refractive index according to light intensities of input pulses, and demultiplex the plurality of optical pulse sequences obtained by the frequency conversion into optical pulse sequences for different communication channels, by using an optical frequency selection unit for selectively separating optical signals according to frequencies.

15. The optical multiplexing communication system of claim 14, wherein the terminal device uses the optical frequency conversion unit which also has a function for compressing pulse widths of the optical multiplexed signals.

* * * * *